US009841928B2

(12) United States Patent
Ohno

(10) Patent No.: US 9,841,928 B2
(45) Date of Patent: Dec. 12, 2017

(54) STORAGE CONTROL APPARATUS AND COMPUTER READABLE STORAGE MEDIUM

(71) Applicant: FUJITSU LIMITED, Kawasaki-shi, Kanagawa (JP)

(72) Inventor: Yoshinari Ohno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 14/480,693

(22) Filed: Sep. 9, 2014

(65) Prior Publication Data
US 2015/0100822 A1  Apr. 9, 2015

(30) Foreign Application Priority Data

Oct. 9, 2013 (JP) .................................. 2013-212043

(51) Int. Cl.
G06F 3/00 (2006.01)
G06F 3/06 (2006.01)
G06F 11/10 (2006.01)

(52) U.S. Cl.
CPC ............ G06F 3/067 (2013.01); G06F 3/0619 (2013.01); G06F 3/0634 (2013.01); G06F 11/108 (2013.01); *G06F 2211/1059* (2013.01)

(58) Field of Classification Search
CPC ...... G06F 11/108; G06F 3/067; G06F 3/0619; G06F 3/0634
See application file for complete search history.

(56) References Cited

U.S. PATENT DOCUMENTS 6,718,435 B2 * 4/2004 Riedle .................. G06F 3/0601
711/114
7,523,286 B2 * 4/2009 Ramany ................ G06F 3/0605
710/240

(Continued)

FOREIGN PATENT DOCUMENTS

JP  10-269032      10/1998
JP  2007-180610 A   7/2007

(Continued)

OTHER PUBLICATIONS

Japanese Office Action dated Mar. 14, 2017 for corresponding Japanese Patent Application No. 2013-212043, with Partial English Translation, 8 pages.

Primary Examiner — Matt Kim
Assistant Examiner — Katherine Lin
(74) Attorney, Agent, or Firm — Fujitsu Patent Center

(57) ABSTRACT

A storage control apparatus forms a RAID by plural storage media and stores and holds data on a file-by-file basis. A number-of-writable-times management unit manages the number of writable times for each storage medium. A write-destination management unit manages data write destinations in the storage media. When updating write object data whose write destination is one of storage media constituting a group (first storage medium), a relocation unit relocates the write object data by setting a write destination to a second storage medium which is different from the first storage medium. A write-destination update unit updates the data write destinations in the storage media managed by the write-destination management unit according to the relocating. Through the relocating, the storage control apparatus is able to control the number of writable times which decreases along with data writing.

10 Claims, 26 Drawing Sheets

(56) References Cited

U.S. PATENT DOCUMENTS

| | | | |
|---|---|---|---|
| 9,043,567 B1 * | 5/2015 | Modukuri | G06F 3/0665 |
| | | | 711/162 |
| 9,063,874 B2 * | 6/2015 | Zhong | G06F 12/0246 |
| 2008/0034156 A1 | 2/2008 | Kawaguchi et al. | |
| 2010/0005228 A1 | 1/2010 | Fukutomi et al. | |
| 2010/0281230 A1 * | 11/2010 | Rabii | G06F 3/0605 |
| | | | 711/165 |
| 2015/0324148 A1 * | 11/2015 | Achtenberg | G06F 11/1012 |
| | | | 711/103 |

FOREIGN PATENT DOCUMENTS

| | | |
|---|---|---|
| JP | 2008-040713 | 2/2008 |
| JP | 2010-015516 | 1/2010 |

* cited by examiner

FIG. 1
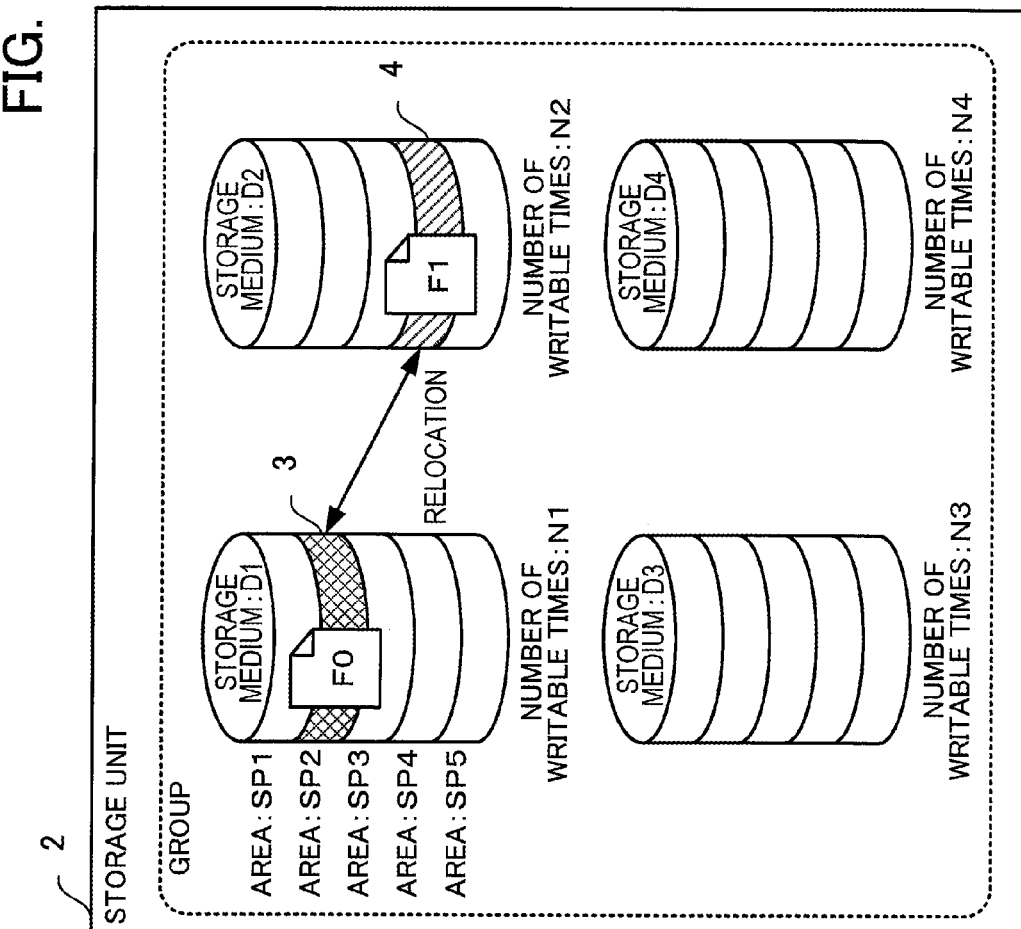
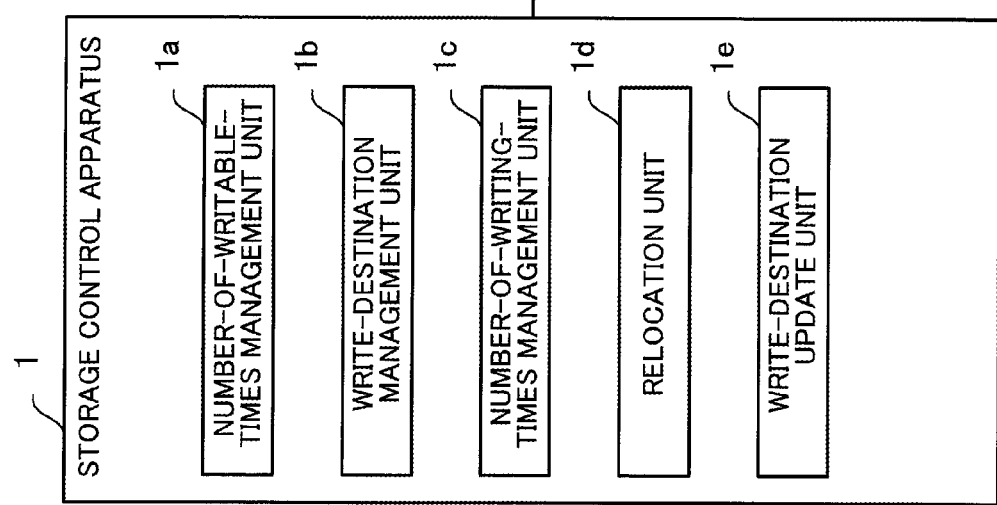

50 CURRENT NUMBER-OF-WRITABLE-TIMES MANAGEMENT TABLE

| SSD | NUMBER OF WRITABLE TIMES |
|---|---|
| SSD(1) | CWAT(1) |
| SSD(2) | CWAT(2) |
| SSD(3) | CWAT(3) |
| ... | ... |
| SSD(n) | CWAT(n) |

FIG. 8

51 PREVIOUS NUMBER-OF-WRITABLE-TIMES MANAGEMENT TABLE

| SSD | NUMBER OF WRITABLE TIMES |
|---|---|
| SSD(1) | PWAT(1) |
| SSD(2) | PWAT(2) |
| SSD(3) | PWAT(3) |
| ... | ... |
| SSD(n) | PWAT(n) |

52 NUMBER-OF-WRITING-TIMES MANAGEMENT TABLE

| RAID GROUP | SSD | STRIPE | NUMBER OF WRITING TIMES |
|---|---|---|---|
| RAID(1) | SSD(1) | ST(1) | WT(111) |
| | | ST(2) | 0 |
| | | ST(3) | −1 |
| | | ... | ... |
| | | ST(n) | WT(11n) |
| | SSD(2) | ST(1) | WT(121) |
| | ... | ... | ... |
| ... | | | |

53 RELOCATION TABLE

| RAID GROUP | SSD | NUMBER OF RELOCATIONS |
|---|---|---|
| RAID(1) | SSD(1) | RP(1) |
| | SSD(2) | RP(2) |
| | SSD(3) | RP(3) |
| | ... | ... |
| | SSD(n) | RP(n) |
| ... | ... | ... |

FIG. 12

STORAGE CONTROL APPARATUS AND COMPUTER READABLE STORAGE MEDIUM

CROSS-REFERENCE TO RELATED APPLICATION

This application is based upon and claims the benefit of priority of the prior Japanese Patent Application No. 2013-212043, filed on Oct. 9, 2013, the entire contents of which are incorporated herein by reference.

FIELD

The embodiments discussed herein relate to a storage control apparatus and a computer readable storage medium.

BACKGROUND

When performing data processing by a plurality of information processing terminals, a file server (storage device) typically handles centralized data management in order to increase the efficiency of maintenance and management of data. The file server may be a Network Attached Storage (NAS) device, for example.

A NAS device collectively manages many storage media using Redundant Array Inexpensive (Independent) Disks (RAID) or the like, thereby improving the reliability of data and providing a large-capacity storage area. A NAS device may use Hard Disk Drives (HDDs), semiconductor-memory SSDs (Solid State Drives: flash memory drives), or the like, as storage media. Here, an SSD has a faster access performance than an HDD and is particularly superior in terms of random read performance. In addition, despite their low power consumption, low heat radiation, and high shock resistance, SSDs have disadvantages such as higher price per capacity than HDDs, and limitation on the number of writable times (for example, see Japanese Laid-open Patent Publication No. 2008-40713).

A NAS device ensures data protection using parity data in the event of a failure of an SSD included in a RAID (e.g., RAID 4, RAID 5) due to usage exceeding the number of writable times (for example, see Japanese Laid-open Patent Publication No. 10-269032, and Japanese Laid-open Patent Publication No. 2010-15516).

However, storage devices, including NAS devices, have a risk of losing data in the event of a failure of two or more SSDs included in a RAID.

SUMMARY

According to an aspect, there is provided a storage control apparatus including a memory configured to hold a number of writable times for each of storage media constituting a group, and data write destinations in the storage media; and one or more processors configured to perform a procedure including: relocating, when updating write object data whose write destination is set to a first storage medium of the storage media constituting the group, the write object data by setting a write destination to a second storage medium which is different from the first storage medium, based on the number of writable times for each of the storage media and a number of writing times for each of the data write destinations; and updating the data write destinations in the storage media held in the memory, according to the relocating.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary configuration of a storage control apparatus of a first embodiment;

FIG. 8 illustrates an exemplary current-number-of-writable-times management table of the second embodiment;

FIG. 9 illustrates an exemplary previous-number-of-writable-times management table of the second embodiment;

FIG. 10 illustrates an exemplary number-of-writing-times management table of the second embodiment;

FIG. 12 illustrates an exemplary relocation table of the second embodiment;

DESCRIPTION OF EMBODIMENTS

Figure 2:
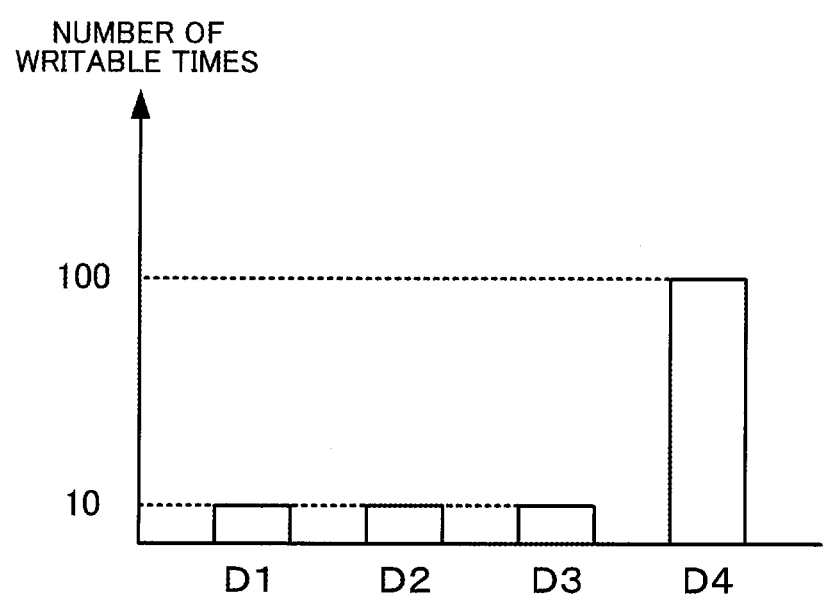
FIG. 2 illustrates an exemplary state in which numbers of writable times for a plurality of storage media are close to each other, and there is a risk of simultaneous failure.

Several embodiments will be described below with reference to the accompanying drawings, wherein like reference numerals refer to like elements throughout.

First Embodiment

First, a storage control apparatus of a first embodiment will be described, referring to FIG. 1. FIG. 1 illustrates an exemplary configuration of the storage control apparatus of the first embodiment.

A storage control apparatus 1 manages a plurality of storage media D1, D2, D3 and D4 included in a storage unit 2 as a group and may store and hold data on a file-by-file basis. In addition, each of the storage media D1, D2, D3 and D4 has a plurality of areas (e.g., stripes) SP1, SP2, SP3, SP4 and SP5 which are obtained by segmenting each of the storage media into predetermined units. The numbers of writable times for the storage media D1, D2, D3 and D4 are limited to N1, N2, N3 and N4, respectively.

For example, the storage control apparatus 1 configures a RAID with the plurality of storage media D1, D2, D3 and D4, stores and holds data on a file-by-file basis and functions as a file server. A RAID includes a plurality of storage media, and is an exemplary group that improves reliability of data stored and held therein by redundant configuration. Each of the storage media D1, D2, D3 and D4 has a limitation on the number of writable times, and is a storage medium such as an SSD subject to failure management based on the number of writing times.

The group illustrated in FIG. 1 is formed by four storage media D1, D2, D3 and D4 for simplicity of explanation, but it may be formed by two, three, four or more storage media. Similarly, the number of areas illustrated in FIG. 1 is not limited to five of the areas SP1, SP2, SP3, SP4 and SP5, but may be any number.

The storage control apparatus 1 includes a number-of-writable-times management unit 1a, a write-destination management unit 1b, a number-of-writing-times management unit 1c, a relocation unit 1d, and a write-destination update unit 1e. The number-of-writable-times management unit 1a manages the number of writable times for each of storage media constituting the group. In other words, the number-of-writable-times management unit 1a manages the number of writable times N1 for the storage medium D1, the number of writable times N2 for the storage medium D2, the number of writable times N3 for the storage medium D3, and the number of writable times N4 for the storage medium D4.

The write-destination management unit 1b manages data write destinations in the storage medium. For example, when data F0 is to be written in an area 3 (area SP2 of the storage medium D1), the write-destination management unit 1b manages the write destination of the data F0 such that the write destination is the area SP2 of the storage medium D1. The number-of-writing-times management unit 1c manages the number of writing times for each of the data write destinations, i.e., for each area in each of the storage media.

The relocation unit 1d, when updating write object data whose write destination is set to one of the storage media (first storage medium) constituting the group, relocates the write object data by setting a write destination to a second storage medium which is different from the first storage medium. The relocation unit 1d performs relocation based on the number of writable times for each of the storage media managed by the number-of-writable-times management unit 1a and the number of writing times for each data write destination managed by the number-of-writing-times management unit 1c.

For example, the relocation unit 1d, when updating the data F0 whose write destination is set to the area 3 of the storage medium D1 to data F1, relocates the data F1 to an area 4 (area SP4 of the storage medium D2) of the storage medium D2 which is different from the storage medium D1.

The write-destination update unit 1e updates the data write destination to the storage medium managed by the write-destination management unit 1b according to the relocating.

As thus described, the storage control apparatus 1 may control the number of writable times which decreases along with writing of data by relocating the data from the first storage medium to the second storage medium.

The storage medium to be the target of relocation (relocation source or relocation destination) may be determined on the basis of the numbers of writable times N1, N2, N3 and N4 of the storage media D1, D2, D3 and D4 respectively managed by the number-of-writable-times management unit 1a. For example, the storage control apparatus 1 reduces the risk that two or more of the storage media D1, D2, D3 and D4 simultaneously fail by preventing the values of two or more of the numbers of writable times N1, N2, N3 and N4 from becoming close to each other.

In addition, the data to be relocated may be determined on the basis of the number of writing times for each area in each storage medium managed by the number-of-writing-times management unit 1c. In other words, the write frequency for each storage medium may be changed to control the variation of the number of writing times for each area in each storage medium by relocating the data written in an area.

Accordingly, the storage control apparatus 1 may control the numbers of writable times N1, N2, N3 and N4 of the storage media D1, D2, D3 and D4, and reduce the risk of data loss due to simultaneous failure of a plurality of storage media.

Figure 3:
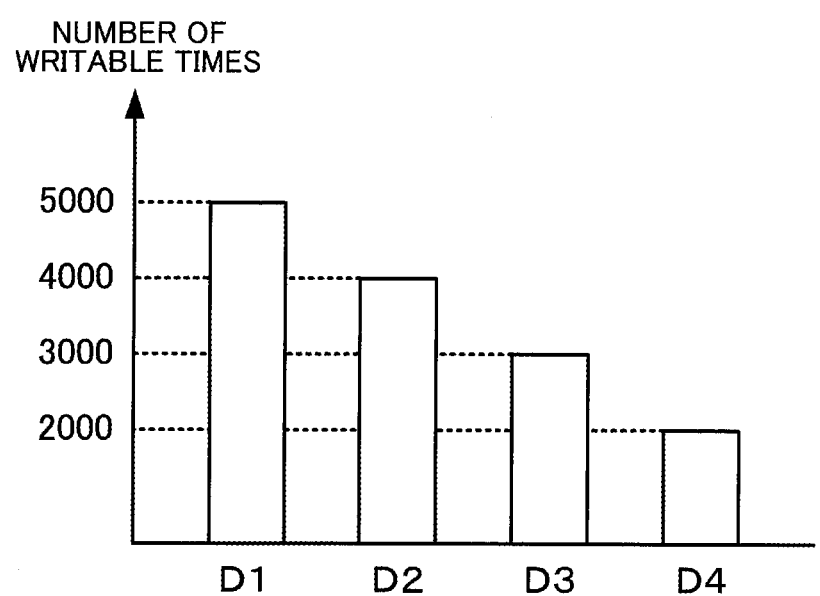
FIG. 3 illustrates an exemplary state in which numbers of writable times for a plurality of storage media are appropriately controlled.

For example, since in the storage media D1, D2 and D3 illustrated in FIG. 2, all the numbers of writable times are about ten, which are close to one another, the risk of simultaneous failure is high. FIG. 2 illustrates an exemplary state in which the numbers of writable times for a plurality of storage media are close to one another, resulting in the risk of simultaneous failure. The storage control apparatus 1 may avoid the state with the risk of simultaneous failure as illustrated in FIG. 2 by controlling the numbers of writable times for the storage media D1, D2, D3 and D4 so that they do not become close to one another as illustrated in FIG. 3. FIG. 3 illustrates an exemplary state in which the numbers of writable times for a plurality of storage media are appropriately controlled.

The storage control apparatus 1 may be integrated with the storage unit 2 to form a storage device.

Second Embodiment

Figure 4:
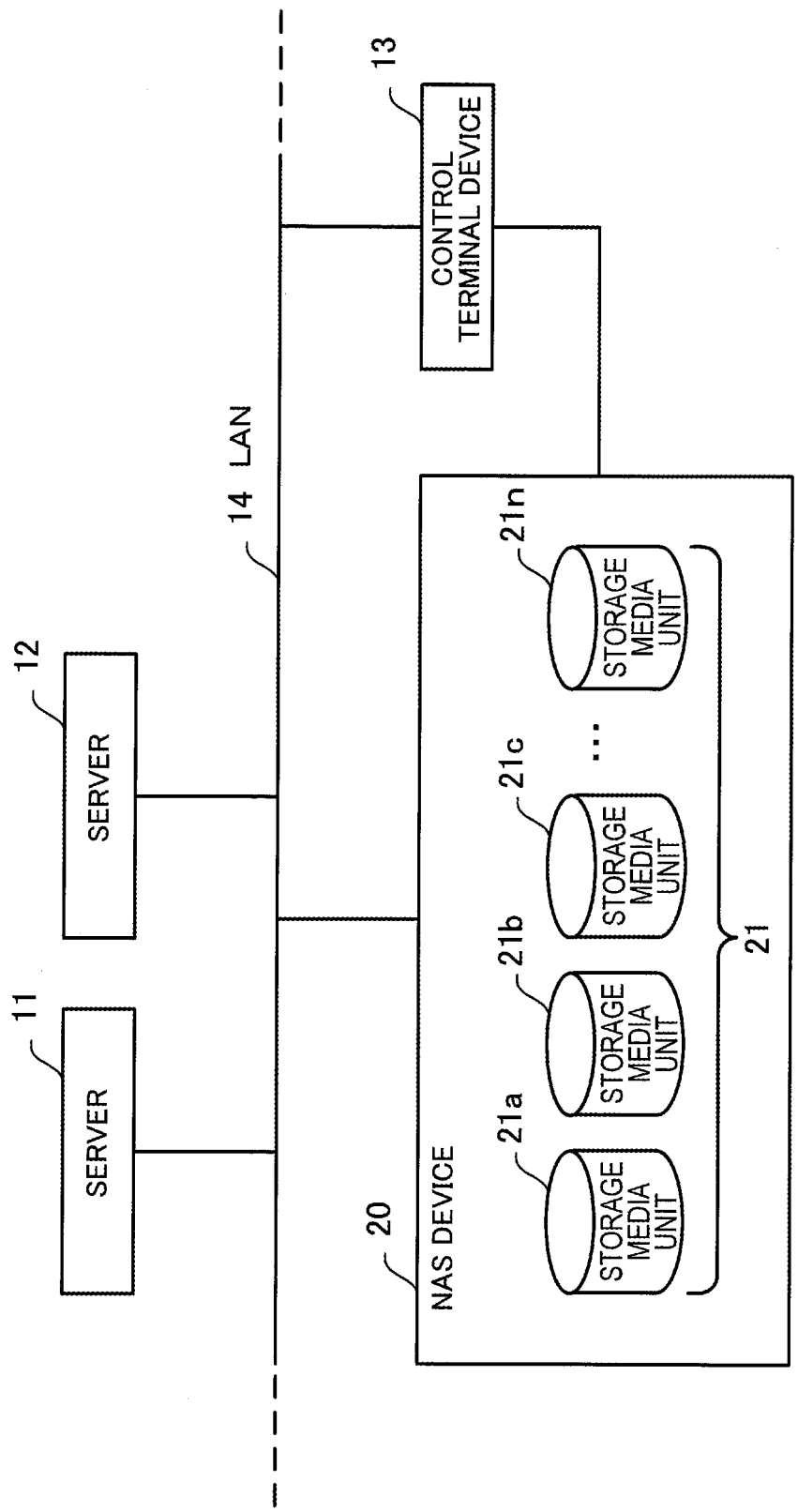
FIG. 4 illustrates an exemplary configuration of a storage system of a second embodiment.

Next, a storage system of a second embodiment will be described, referring to FIG. 4. FIG. 4 illustrates an exemplary configuration of the storage system of the second embodiment.

A storage system 10 includes a plurality of servers (information processing apparatuses) 11 and 12, a NAS device 20, a control terminal device 13, and a Local Area Network (LAN) 14. The servers 11 and 12 perform data processing for each user or each application, using a file server function provided by the NAS device 20. The NAS device 20 is a file server providing the servers 11 and 12 with a file connecting function. The NAS device 20 has a plurality of storage media units (storage units) 21 (storage media units 21a, 21b, 21c, . . . , 21n) to provide a large-capacity storage area. The NAS device 20 is one form of a storage control apparatus which controls a plurality of storage units.

The control terminal device 13, which is a terminal device for controlling the NAS device 20, performs operation monitoring and various setting of the NAS device 20, maintenance in the event of abnormality, and the like. The LAN 14, which is a communication path for wired and/or wireless communication, connects the NAS device 20 and the servers 11 and 12. The LAN 14 is an exemplary network connecting the NAS device 20 and the servers 11 and 12, and may include public lines or the like.

Figure 5:
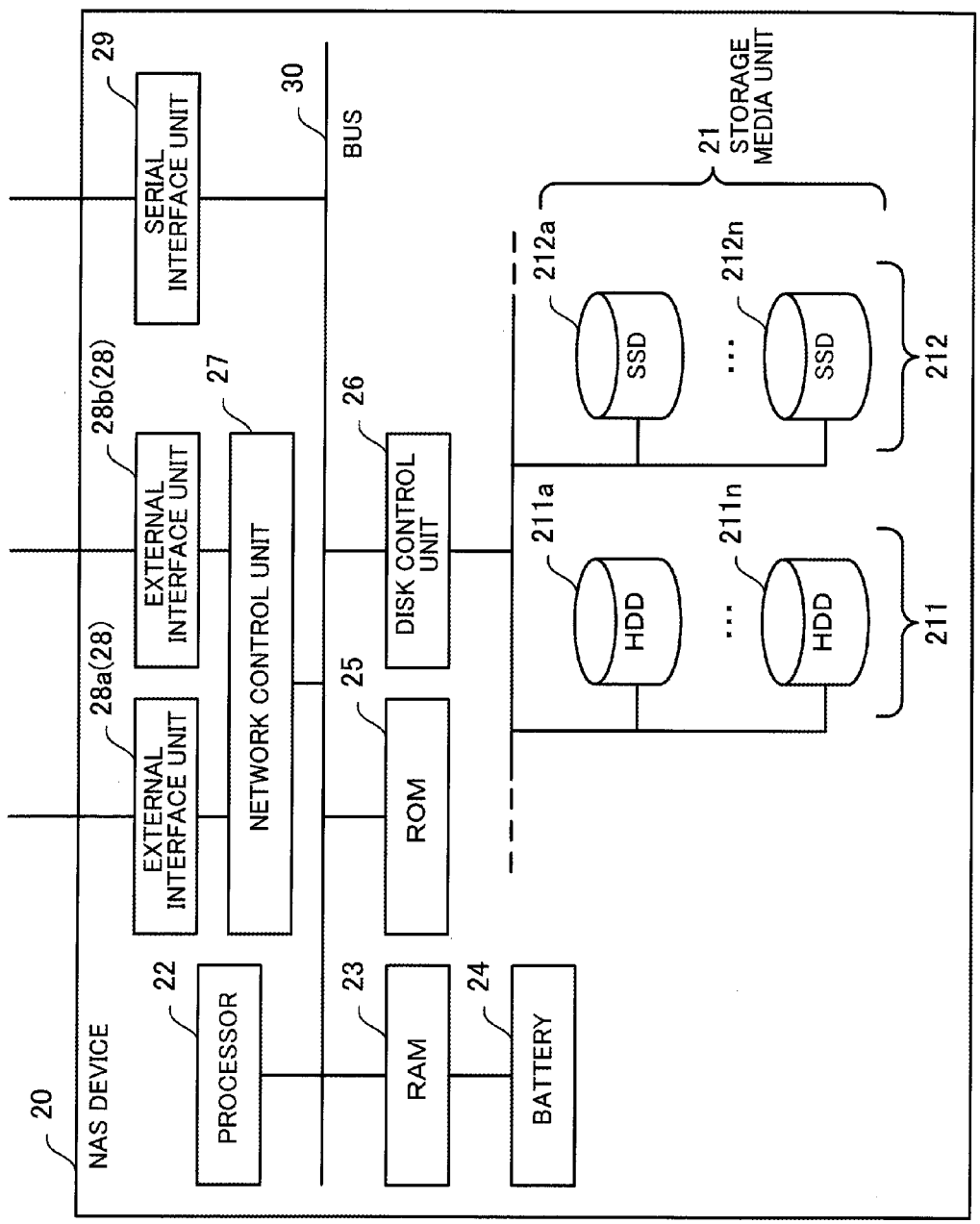
FIG. 5 illustrates an exemplary hardware configuration of a NAS device of the second embodiment.

Next, the NAS device 20 of the second embodiment will be described, referring to FIG. 5. FIG. 5 illustrates an exemplary hardware configuration of the NAS device of the second embodiment.

The NAS device 20 is controlled as a whole by a processor 22. The processor 22 is connected with a Random Access Memory (RAM) 23 and a plurality of peripheral devices via a bus 30.

The processor 22 may be a multiprocessor. The processor 22 is, for example, a Central Processing Unit (CPU), a Micro Processing Unit (MPU), a Digital Signal Processor (DSP), an Application Specific Integrated Circuit (ASIC), or a Programmable Logic Device (PLD). In addition, the processor 22 may be a combination of two or more of the components CPU, MPU, DSP, ASIC and PLD.

The RAM 23 is used as the main storage device of the NAS device 20. At least part of a program of an Operating System (OS), a firmware, and application programs to be executed by the processor 22 are temporarily stored in the RAM 23. In addition, various kinds of data to be used for processing by the processor are stored in the RAM 23. In addition, data to be transferred between the servers 11, 12 and the NAS device 20 are temporarily stored in the RAM 23. The RAM 23 may include a cache memory separately from the memory used for storing various kinds of data. The RAM 23 has backup power supplied from a battery 24. The battery 24 may be a lithium-ion battery, for example.

Peripheral devices connected to the bus 30 include a Read Only Memory (ROM) 25, a disk control unit 26, a network control unit 27, and a serial interface unit 29.

The ROM 25 holds the storage content even when power supply to the NAS device 20 is shut down. The ROM 25 is, for example, a semiconductor storage device such as an Electrically Erasable and Programmable ROM (EEPROM) or a flash memory, or an HDD. In addition, the ROM 25 is used as an auxiliary storage device of the NAS device 20. The program of operating system, the firmware, the application programs, and the various kinds of data are stored in the ROM 25.

The disk control unit 26 controls the storage media unit 21 storing files. Although the storage media unit 21 is configured to include an HDD 211 and an SSD 212, it may be configured without including the HDD 211. The HDD 211 may be built in the NAS device 20 or externally connected thereto. The disk control unit 26 controls data transfer between the storage media unit 21 and the bus 30. The disk control unit 26 may obtain various parameters of the SSD 212 using a self-diagnosis function (e.g., Self-Monitoring, Analysis and Reporting Technology (S.M.A.R.T.)) included in the SSD 212.

The network control unit 27 is connected to an external interface unit 28. The external interface unit controls the interface (e.g., Ethernet (registered trademark)) connected to the LAN 14. The external interface unit 28 is provided in plurality (external interface units 28a and 28b) for the purpose of redundancy or load distribution.

The serial interface unit 29 is serially connected to the control terminal device 13. The NAS device 20 may be connected to the control terminal device via the external interface unit 28 or the serial interface unit 29.

The HDD 211 and the SSD 212 are storage media which store data to provide the servers 11 and 12 with the file connecting function. For example, the HDD 211 is provided in plurality, such as HDDs 211a, . . . , 211n, allowing a RAID (e.g., RAID 4, RAID 5, RAID 6, etc.) to be constructed. In addition, the SSD 212 is provided in plurality, such as SSDs 212a, . . . , 212n, allowing the RAID to be constructed. In addition, some of the HDDs 211a, . . . , 211n or the SSDs 212a, . . . , 212n are prepared as spare disks to replace a failed HDD 211 or SSD 212.

The processing function of the NAS device 20 of the second embodiment may be realized by the aforementioned hardware configuration. The storage control apparatus 1 illustrated in the first embodiment may also be realized by hardware similar to the illustrated NAS device 20.

The NAS device 20 realizes the processing function of the second embodiment by executing a program stored in a computer-readable storage medium, for example. The program describing the content of processing to be performed by the NAS device 20 may be stored in various storage media. For example, the program to be executed by the NAS device 20 may be stored in the ROM 25. The processor 22 loads at least a part of the program in the ROM 25 to the RAM 23 and executes the program. In addition, the program to be executed by the NAS device 20 may also be stored in a portable storage medium such as an optical disk, a memory device, or a memory card, which are not illustrated. Examples of the optical disk include a Digital Versatile Disc (DVD), a DVD-RAM, a Compact Disc Read Only Memory (CD-ROM), a Recordable (CD-R)/ReWritable (RW) CD, and the like. The memory device is a storage medium equipped with a communication function with an external interface unit 28 or a device connection interface not illustrated. For example, the memory device may write data to a memory card or read data from the memory card using a memory reader/writer. The memory card is a card-type storage medium.

The program stored in portable storage medium becomes executable after being installed in the ROM 25 by control from the processor 22, for example. Alternatively, the processor 22 may read the program directly from the portable storage medium and execute it.

Figure 6:
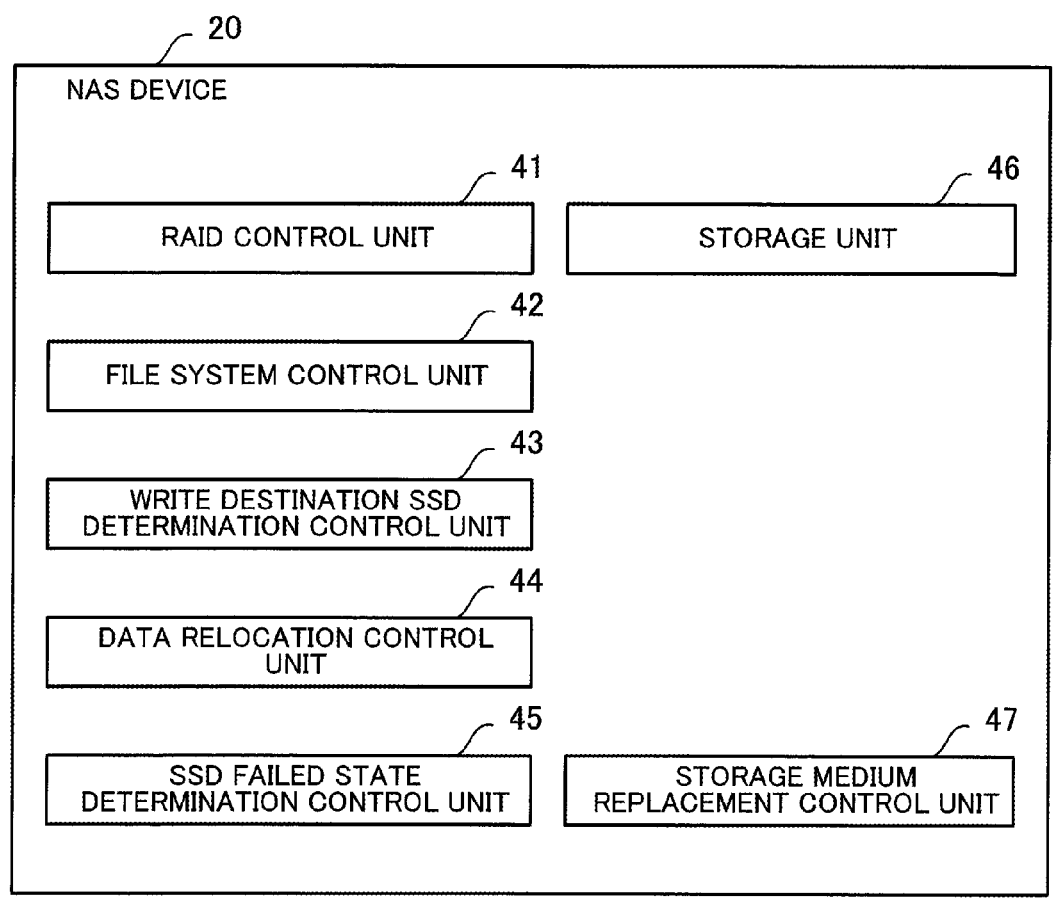
FIG. 6 illustrates an exemplary functional configuration of the NAS device of the second embodiment.

Next, the functional configuration of the NAS device 20 of the second embodiment will be described, referring to FIG. 6. FIG. 6 illustrates an exemplary functional configuration of the NAS device of the second embodiment.

The NAS device 20 includes a RAID control unit 41, a file system control unit 42, a write destination SSD determination control unit 43, a data relocation control unit 44, an SSD failed state determination control unit 45, a storage unit 46, and a storage medium replacement control unit 47.

The RAID control unit 41 controls a RAID configured by the plurality of HDDs 211 or the plurality of SDDs 212. For example, the RAID control unit 41 configures a RAID 5 with four of the SDDs 212 as a data disk. The data disk includes a plurality of data groups, each being formed by units called stripes. The RAID control unit 41 manages the data groups according to stripe numbers, and stores data with redundancy by storing data in the stripes having the same stripe number in three data disks and storing the parity in the stripe having the same stripe number in the remaining one data disk.

The file system control unit 42 manages and controls files to be stored in the storage media unit 21. For example, the file system control unit 42 performs file (data) management using an inode. When a file write destination is changed by data relocation described below, the file system control unit 42 updates control information of a data block. The control information of the data block includes identification information of the storage media unit 21 and location information in the storage media unit 21.

The write destination SSD determination control unit 43 performs determination control of the SSD 212 which becomes the data write destination. The data relocation control unit 44 performs relocation control of write object data. The SSD failed state determination control unit 45 performs failure determination of the SSD 212. The storage medium replacement control unit 47 replaces the SSD 212 (data disk) determined to have failed by the SSD failed state determination control unit 45 with a replacement SSD 212 (spare disk).

The RAID control unit 41, the file system control unit 42, the write destination SSD determination control unit 43, the data relocation control unit 44, the SSD failed state determination control unit 45, and the storage medium replacement control unit 47 are realized when the processor 22 reads a predetermined control procedure (program) from the storage unit 46 and operates in accordance with the control procedure. The RAID control unit 41, the file system control unit 42, the write destination SSD determination control unit 43, the data relocation control unit 44, and the SSD failed state determination control unit 45 may be implemented by the processor 22 sharing the processes with another control unit (e.g., the disk control unit 26). The storage unit 46 includes the RAM 23 and the ROM 25. The storage unit stores various control information, setting information, and the like, in addition to the predetermined control procedure.

Figure 7:
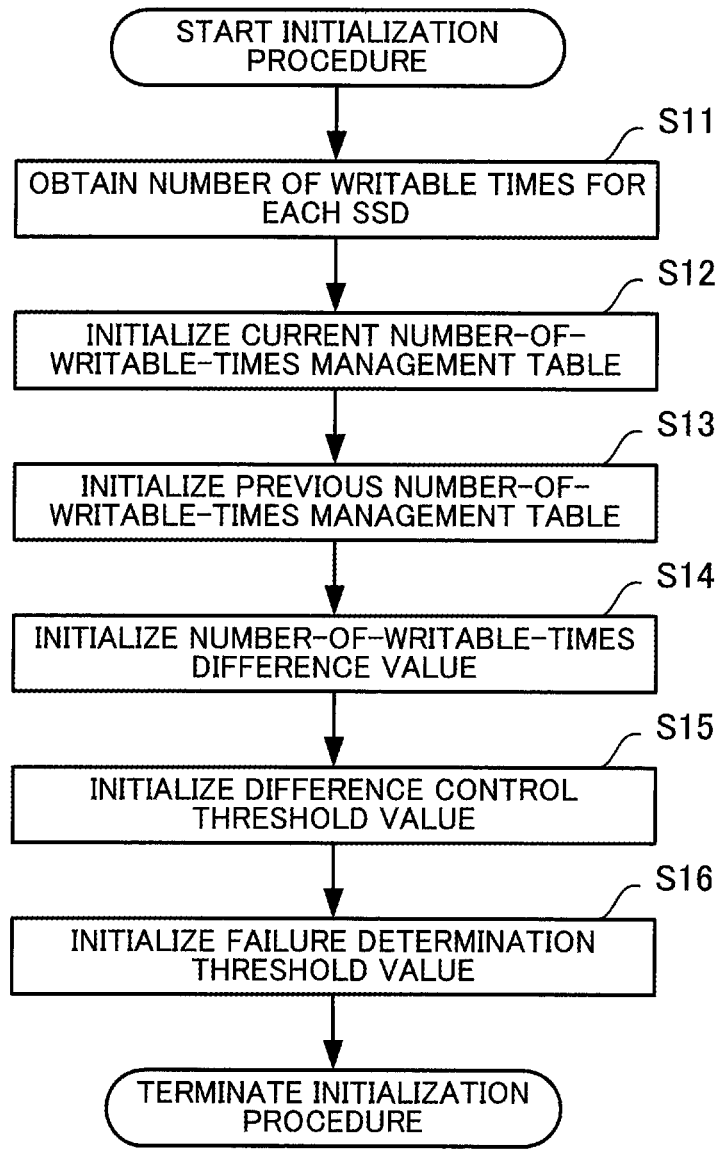
FIG. 7 illustrates a flow chart of an initialization procedure of the second embodiment.

Next, an initialization procedure of the second embodiment will be described, referring to FIGS. 7 to 10. FIG. 7 illustrates a flow chart of the initialization procedure of the second embodiment. The NAS device 20 performs the initialization procedure at activation of the NAS device 20.

[Step S11] The processor 22 obtains the number of writable times for each SSD 212. The NAS device 20 may obtain the number of writable times for each SSD 212 using the self-diagnosis function provided to the SSD 212. It suffices that the number of writable times is an indicator of the remanent life of the SSD 212, or the number of writable times may also be expressed by a ratio or the like without being limited to the number of times.

[Step S12] The processor 22 initializes a current number-of-writable-times management table according to the obtained number of writable times for each SSD 212. Here, the current number-of-writable-times management table will be described, referring to FIG. 8. FIG. 8 illustrates an example of the current number-of-writable-times management table of the second embodiment. The current number-of-writable-times management table 50 stores the number of writable times for each SSD 212. The current number-of-writable-times management table 50 stores numbers of writable times for n SSDs 212, namely, SSD (1), SSD (2), SSD (3), . . . , SSD (n). For example, the current number-of-writable-times management table 50 stores CWAT (1) in SSD (1) and CWAT (2) in SSD (2). The current number-of-writable-times management table 50 is held in the storage unit 46.

[Step S13] The processor 22 initializes the previous number-of-writable-times management table according to the obtained number of writable times for each SSD 212. The previous number-of-writable-times management table has a configuration similar to that of the current number-of-writable-times management table. Here, the previous number-of-writable-times management table will be described, referring to FIG. 9. FIG. 9 illustrates an example of the previous number-of-writable-times management table of the second embodiment.

The previous number-of-writable-times management table 51 stores the number of writable times for each SSD 212. The previous number-of-writable-times management table 51 stores numbers of writable times for n SSDs 212, namely, SSD (1), SSD (2), SSD (3), . . . , SSD (n). For example, the previous number-of-writable-times management table 51 stores PWAT (1) in SSD (1) and PWAT (2) in SSD (2). The previous number-of-writable-times management table 51 is held in the storage unit 46.

The previous number-of-writable-times management table 51 is updated according to the content of the current number-of-writable-times management table 50, when the current number-of-writable-times management table 50 is updated. The processor 22 functions as the write destination SSD determination control unit 43, and may manage the number of writable times at a different timing for each SSD 212, according to the current number-of-writable-times management table 50 and the previous number-of-writable-times management table 51.

[Step S14] The processor 22 initializes the number-of-writable-times difference value to a preliminarily set setting value. The number-of-writable-times difference value is a difference set between numbers of writable times for each SSD 212. For example, when the number of writable times for the SSD 212 is 10000 at the point of shipment, 5% of which, i.e., 500 times is set as the initial value. The setting value of the number-of-writable-times difference value may be changed from the control terminal device 13, and the initialized number-of-writable-times difference value is held in the storage unit 46.

[Step S15] The processor 22 initializes the difference control threshold value to a setting value preliminarily set. The difference control threshold value is a threshold value for determining that there have been writings to the SSD 212 for a certain number of times. For example, when the number of writable times for the SSD 212 is 10000 at the time of shipment, 100 times, which corresponds to 1%, is set as the initial value. The setting value of the difference control threshold value may be changed from the control terminal device 13, and the initialized difference control threshold value is held in the storage unit 46.

[Step S16] The processor 22 initializes the failure determination threshold value to a setting value preliminarily set. The failure determination threshold value is a threshold value for determining that an SSD 212 concerned is about to fail. For example, when the number of writable times for the SSD 212 is 10000 at the time of shipment, 100 times, which corresponds to 1%, is set as the initial value. The setting value of the failure determination threshold value may be changed from the control terminal device 13, and the initialized failure determination threshold value is held in the storage unit 46.

After having initialized the failure determination threshold value, the NAS device 20 terminates the initialization procedure.

Next, the number-of-writing-times management table of the second embodiment will be described, referring to FIG. 10. FIG. 10 illustrates an exemplary number-of-writing-times management table of the second embodiment.

The number-of-writing-times management table stores a write position and the number of writing times at the write position for each SSD 212 constituting a RAID group. Specifically, the number-of-writing-times management table 52 stores identification information (e.g., RAID (1)) which may identify a RAID group being constructed, and identification information (e.g., SSD (1)) which may identify an SSD 212 constituting a RAID group for each RAID group. Furthermore, the number-of-writing-times management table 52 stores identification information (e.g., ST (1)) which may identify a stripe indicating a write position for each SSD 212 and the number of writing times for each stripe. With regard to the RAID group, the SSD, and the stripe, corresponding identification information is stored when the RAID is constructed, and "0" is stored as the initial value of the number of writing times.

The number of writing times is incremented by "1" when data is written and initialized to "0" when the data is no longer useful. In addition, the number of writing times is fixed to "−1" when the parity has been written. For example, in the number-of-writing-times management table 52, the data written to the RAID (1), the SSD (1), the ST (1) indicates that the number-of-writing-times is WT (111) (here, WT(111)>0). In addition, the number-of-writing-times management table 52 indicates that data is not written or useless data remains in the RAID (1), the SSD (1), the ST (2). In addition, the number-of-writing-times management table 52 indicates that parity is written in the RAID (1), the SSD (1), the ST (3). The number-of-writing-times management table 52 is held in the storage unit 46.

Figure 11:
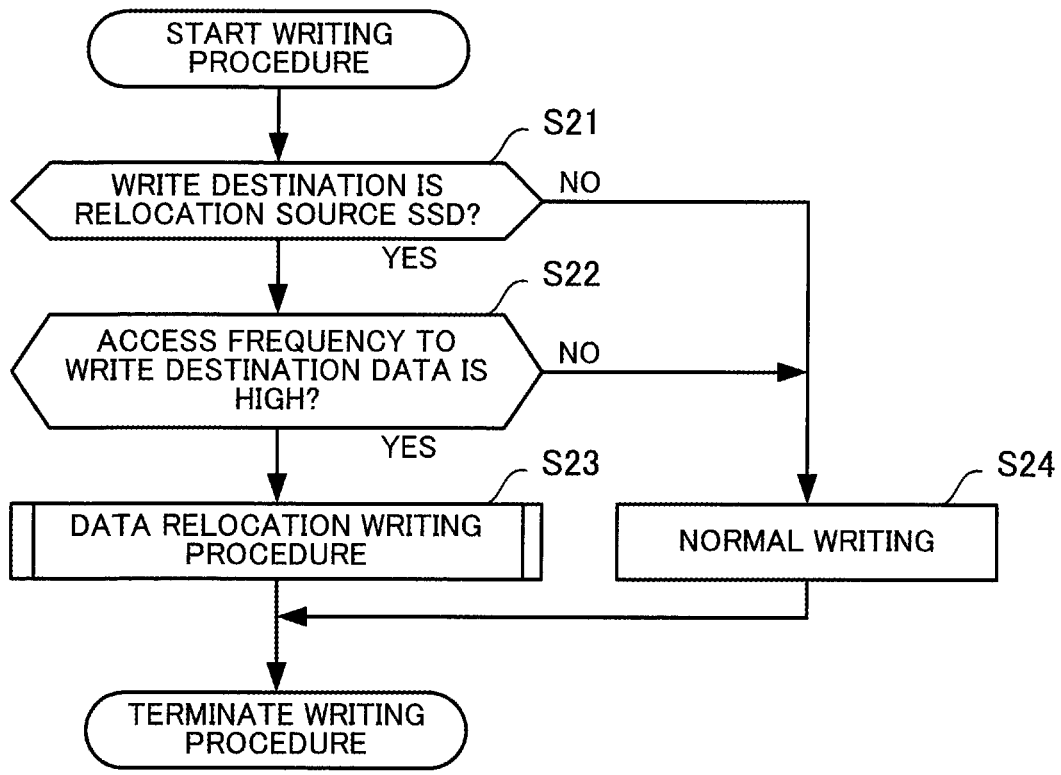
FIG. 11 illustrates a flow chart of a writing procedure of the second embodiment.

Next, a writing procedure of the second embodiment will be described, referring to FIG. 11. FIG. 11 illustrates a flow chart of the writing procedure of the second embodiment. The NAS device 20 performs the writing procedure when a write to the storage media unit 21 occurs.

[Step S21] The processor 22 determines whether or not the write destination is the relocation source SSD. The relocation source SSD is an SSD 212 which becomes a relocation source of data when relocating data so that the numbers of writings to a plurality of SSDs 212 are non-uniformly distributed. The SSD 212 which becomes the relocation source of data is a relocation destination SSD. Determination of whether or not the write destination is the relocation source SSD is performed referring to the relocation table.

Here, the relocation table will be described, referring to FIG. 12. FIG. 12 illustrates an exemplary relocation table of the second embodiment.

A relocation table 53 stores the number of relocations for each SSD 212 included in the RAID group. The number of relocations is the number of sets of data to be relocated. The number of relocations may be regarded as the number of sprites storing the data to be relocated. Specifically, the relocation table 53 stores identification information (e.g., RAID (1)) which may identify a RAID group being constructed and identification information (e.g., SSD (1)) which may identify an SSD 212 included in a RAID group, for each RAID group. Furthermore, the relocation table 53 stores the number of relocations (e.g., RP (1)) for each SSD 212. The RAID group, the number of writing times, and the stripe have corresponding identification information stored therein when the RAID is constructed, with "0" stored as the initial value of the number of relocations. The number of relocations is set to a predetermined value and updated appropriately thereafter when the numbers of writings to the SSD 212 included in the RAID group are non-uniformly distributed.

Figure 13:
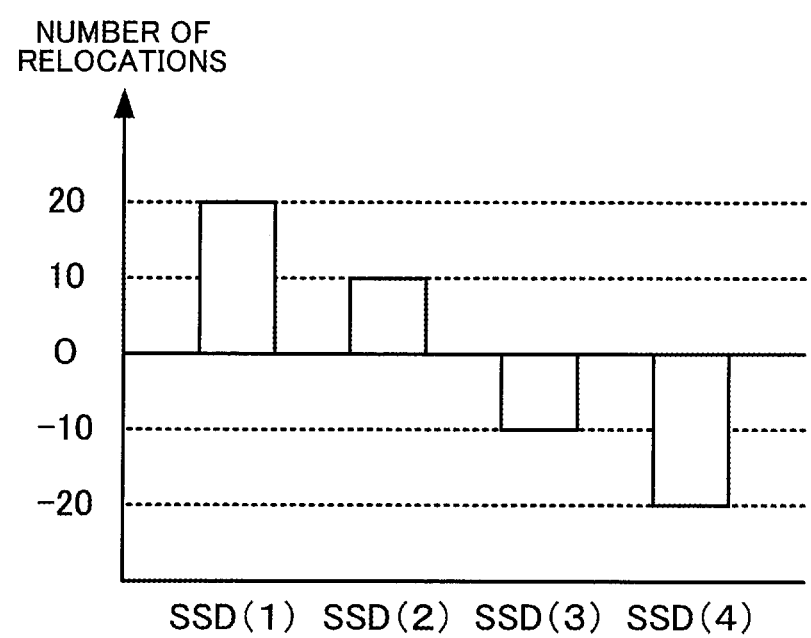
FIG. 13 illustrates an exemplary number of relocations for each SSD of the second embodiment.

Next, the number of relocations for the RAID group having the SSD (1), the SSD (2), the SSD (3) and the SSD (4) will be described, referring to FIG. 13. FIG. 13 illustrates an exemplary number of relocations for each of the SSDs of the second embodiment. According to the numbers of relocations illustrated in FIG. 13, the SSD (1) is the relocation destination SSD of 20 sets of data, and the SSD (2) is the relocation destination SSD of ten sets of data. In addition, the SSD (3) is the relocation source SSD of ten sets of data, and the SSD (4) is the relocation source SSD of 20 sets of data. The total number of relocations for the SSD 212 constituting the RAID group is "0".

Now, the writing procedure will be described again. The processor 22 may determine whether or not the write destination SSD 212 is the relocation source SSD by referring to such a relocation table. The processor 22 proceeds to step S22 when the write destination SSD 212 is the relocation source SSD, or proceeds to step S24 when the write destination SSD 212 is not the relocation source SSD.

[Step S22] The processor 22 determines whether or not the access frequency to the write destination data is high. The access frequency to the write destination data may be calculated by comparing the number of writing times of the write destination data and the total number of writing times, referring to the number-of-writing-times management table 52. The processor 22 may determine whether the access frequency is high or low by comparing the calculated access frequency with a preset threshold value. The processor 22 proceeds to step S23 when the access frequency to the write destination data is high, or proceeds to step S24 when the frequency is not high.

[Step S23] The processor 22 performs a data relocation writing procedure. The data relocation writing procedure is a writing procedure accompanied with relocation of the write destination data. The data relocation writing procedure will be described below, referring to FIG. 14. The processor 22 terminates the writing procedure after having performed the data relocation writing procedure.

[Step S24] The processor 22 performs a normal writing process. The normal writing process is a write process which is not accompanied with relocation of the write destination data. The normal writing process performs read-modify-write in many cases. Furthermore, the processor 22 also updates the parity for the corresponding SSD 212 since the writing target SSD 212 is included in the RAID. The processor 22 terminates the writing procedure after having performed the normal writing process.

Figure 14:
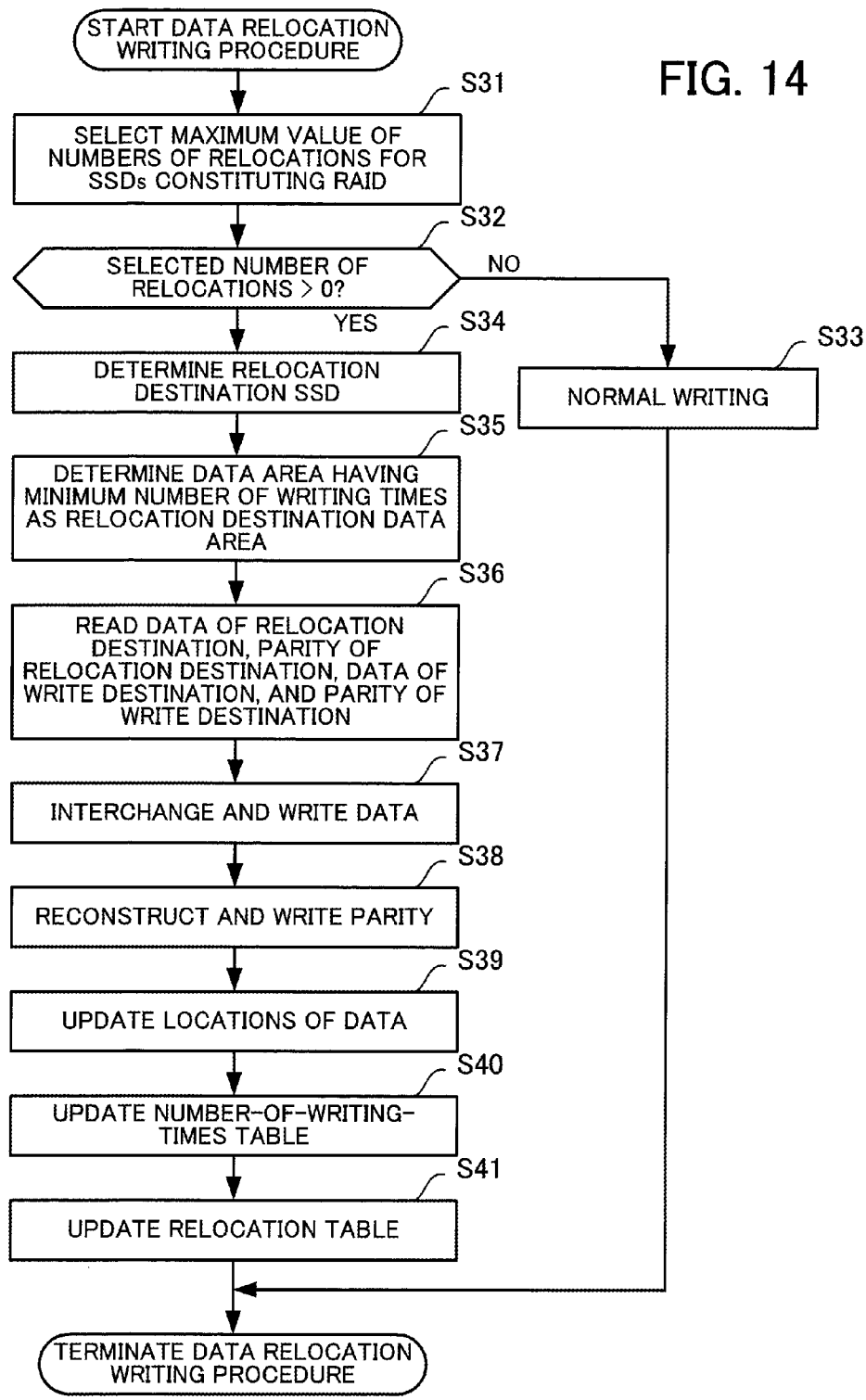
FIG. 14 illustrates a flow chart of a data relocation writing procedure of the second embodiment.

Next, a data relocation writing procedure of the second embodiment will be described, referring to FIG. 14. FIG. 14 illustrates a flow chart of the data relocation writing procedure of the second embodiment. The NAS device 20 performs the data relocation writing procedure at step S23 of the writing procedure.

[Step S31] The processor 22 selects the maximum value of the numbers of relocations for the SSDs 212 constituting the writing target RAID group, referring to the relocation table 53.

[Step S32] The processor 22 determines whether or not the selected number of relocations is larger than "0". The processor 22 proceeds to step S34 when the selected number of relocations is larger than "0", or proceeds to step S33 when the selected number of relocations is not larger than "0".

[Step S33] The processor 22 performs the normal writing process, similarly to step S24 of the writing procedure. The processor 22 terminates the data relocation writing procedure after having performed the normal writing process.

[Step S34] The processor 22 determines the SSD 212 corresponding to the selected number of relocations to be the relocation destination SSD.

[Step S35] The processor 22 selects the data area having the minimum number of writing times (minimum number of writing times data area) among the data areas (stripes) of the SSD 212 selected at step S34, referring to the number-of-writing-times management table 52, and determines it as the relocation destination data area.

[Step S36] The processor 22 reads data of the relocation destination, a parity corresponding to the relocation destination data area (parity of relocation destination), data of the write destination (relocation source), and a parity corresponding to the write destination (relocation source) data area (parity of write destination (relocation source)).

[Step S37] The processor 22 writes data of the relocation destination and data of the write destination in an interchanged manner. In other words, the processor 22 writes the data of the relocation destination to the write destination data area and writes the data of the write destination data to the relocation destination data area.

[Step S38] The processor 22 reconstructs the parity and writes the parity of the relocation destination and the parity of the write destination to corresponding data areas, respectively.

[Step S39] The processor 22 updates the locations of the data of the relocation destination and the data of the write destination. The data of the relocation destination and the data of the write destination may have their locations updated by updating the mode.

[Step S40] The processor 22 updates the number-of-writing-times management table 52 by interchanging the number of writing times of the write destination data area and the number of writing times of the relocation destination data area.

[Step S41] The processor 22 updates the relocation table 53 by interchanging the number of relocations for the relocation source SSD and the number of relocations for the relocation destination SSD. The processor 22 terminates the data relocation writing procedure after having updated the relocation table 53.

Figure 15:
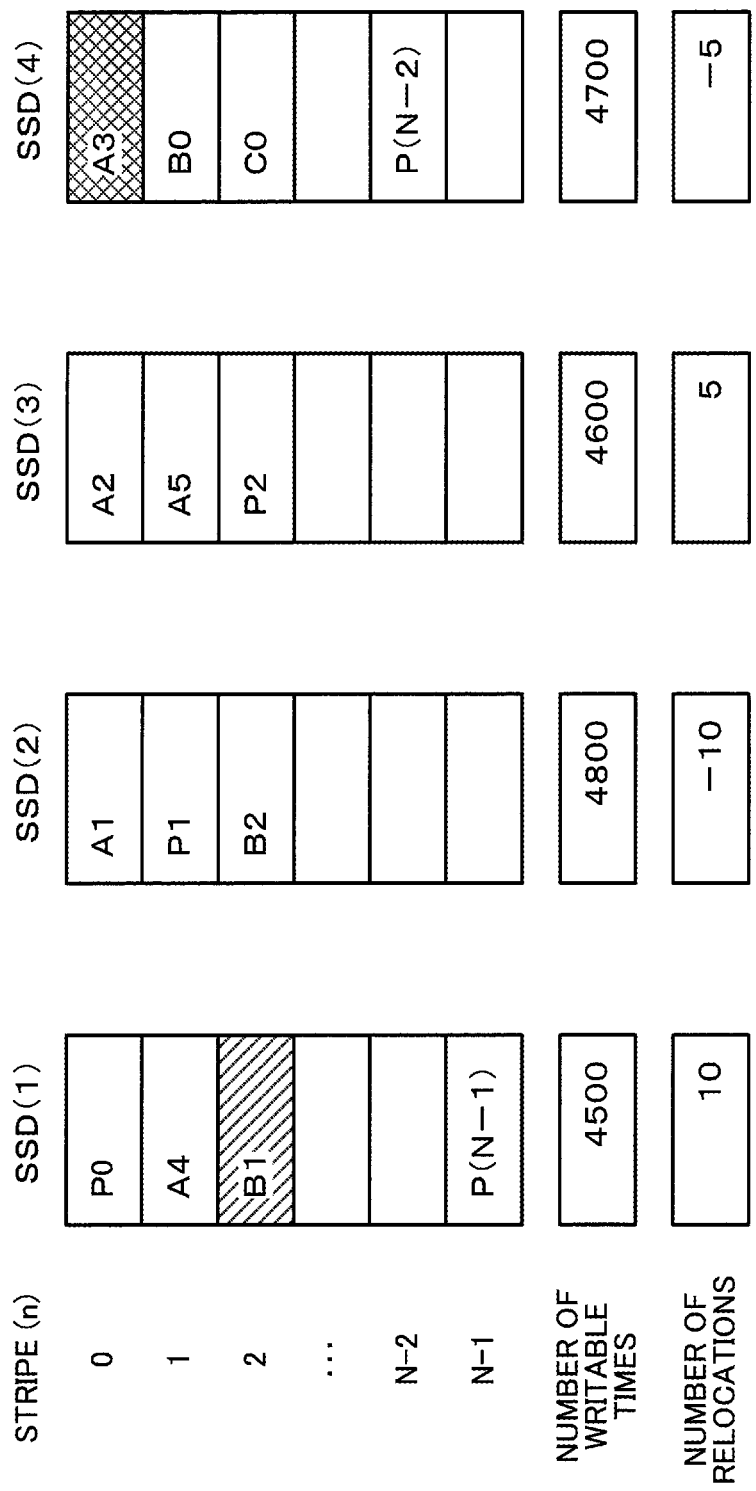
FIG. 15 illustrates exemplary data, number of writable times, and number of relocations held in each SSD of the second embodiment before relocation of written data.
Figure 16:
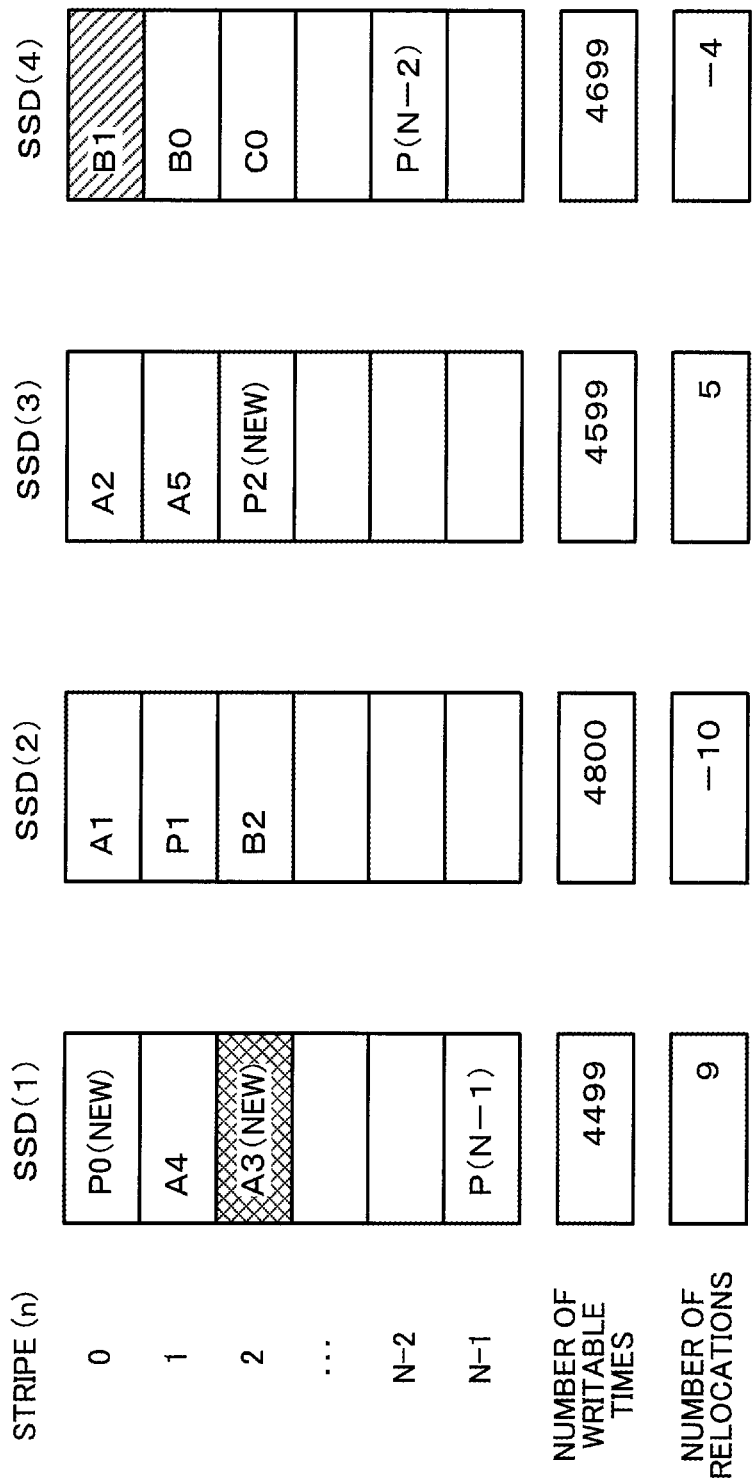
FIG. 16 illustrates exemplary data, number of writable times, and number of relocations held in each SSD of the second embodiment after relocation of the written data.

An exemplary data relocation thus performed will be described, referring to FIGS. 15 and 16. FIG. 15 illustrates exemplary data, number of writable times, and number of relocations held in each SSD of the second embodiment before relocation of the written data. FIG. 16 illustrates exemplary data, number of writable times, and number of relocations held in each SSD of the second embodiment after relocation of the written data.

It is assumed that the NAS device 20 has accepted a write instruction to update data A3 of a RAID group constituted by four SSDs 212 (SSD (1), SSD (2), SSD (3) and SSD (4)) to data A3 (NEW) (FIG. 15). The data A3 is stored in a stripe 0 of the SSD (4). The number of relocations is a negative value of "−5" and therefore the SSD (4) is a relocation source SSD. In addition, when the frequency of writing to the stripe 0 of the SSD (4) is high, the write instruction to update the data A3 to the data A3 (NEW) is executed by the data relocation writing procedure. Determination of whether or not the frequency of writing to the stripe 0 of the SSD (4) is high may be determined referring to the number-of-writing-times management table 52.

The SSD (1) having the maximum number of relocations "10" is selected as the relocation destination SSD. The data area having the minimum number of writing times is selected as the relocation destination data area, among the data areas of the relocation destination SSD, referring to the number-of-writing-times management table 52. For example, a stripe 2 of the SSD (1) is selected as the relocation destination data area. The stripe 2 of the SSD (1) stores data B1.

Here, the NAS device 20 reads data of the relocation destination (data B1), a parity corresponding to the relocation destination data area (parity P2), data of the relocation source (data A3), and a parity corresponding to the relocation source data area (parity P0) to a temporary storage.

The NAS device 20 writes the data of the relocation source (data A3) to the relocation destination data area (stripe 2 of SSD (1)), and writes the data of the relocation destination (data B1) to the relocation source data area (stripe 0 of SSD (4)).

The NAS device 20 reconstructs a new parity (parity P0 (NEW)) from the parity corresponding to the relocation source data area (parity P0) and the data of the relocation destination (data B1), and updates the parity corresponding to the relocation source data area. The NAS device 20 reconstructs a new parity (parity P2 (NEW)) from the parity corresponding to the relocation destination data area (parity P2) and the data of the relocation destination (data A3), and updates the parity corresponding to the relocation destination data area.

The NAS device 20 updates the control information of the data block in the mode, and changes the write position of the data A3 to the stripe 2 of the SSD (1) and the write position of the data B1 to the stripe 0 of the SSD (4).

Accordingly, the NAS device 20 decrements the number of relocations for the SSD (1) by one and increments the number of relocations for the SSD (4) by one, and updates the number of relocations for the SSD (1) and the number of relocations for the SSD (4). In addition, the NAS device 20 decrements, by one, the number of writable times for the SSD (1) and the SSD (4) whose data has been updated, and updates the number of writable times for the SSD (1) and the number of writable times for the SSD (4). Furthermore, the NAS device 20 decrements, by one, the number of writable times for the SSD (3) whose parity has been updated, and updates the number of writable times for the SSD (3) (FIG. 16).

After having updated the number-of-writing-times management table and relocation table as thus described, the NAS device 20 terminates the data relocation writing procedure.

In the aforementioned manner, the NAS device 20 may relocate very frequently updated data (data A3) to the SSD 212 (SSD (1)) whose number of writing times is desired to be increased. Accordingly, the NAS device 20 may control the number of writable times which decreases along with writing of data, thereby reducing the risk of simultaneous failure of two or more of the SSDs 212.

The NAS device 20 may support RAID 6, which is an extension of RAID 5, by allowing reconstruction of the parity.

Figure 17:
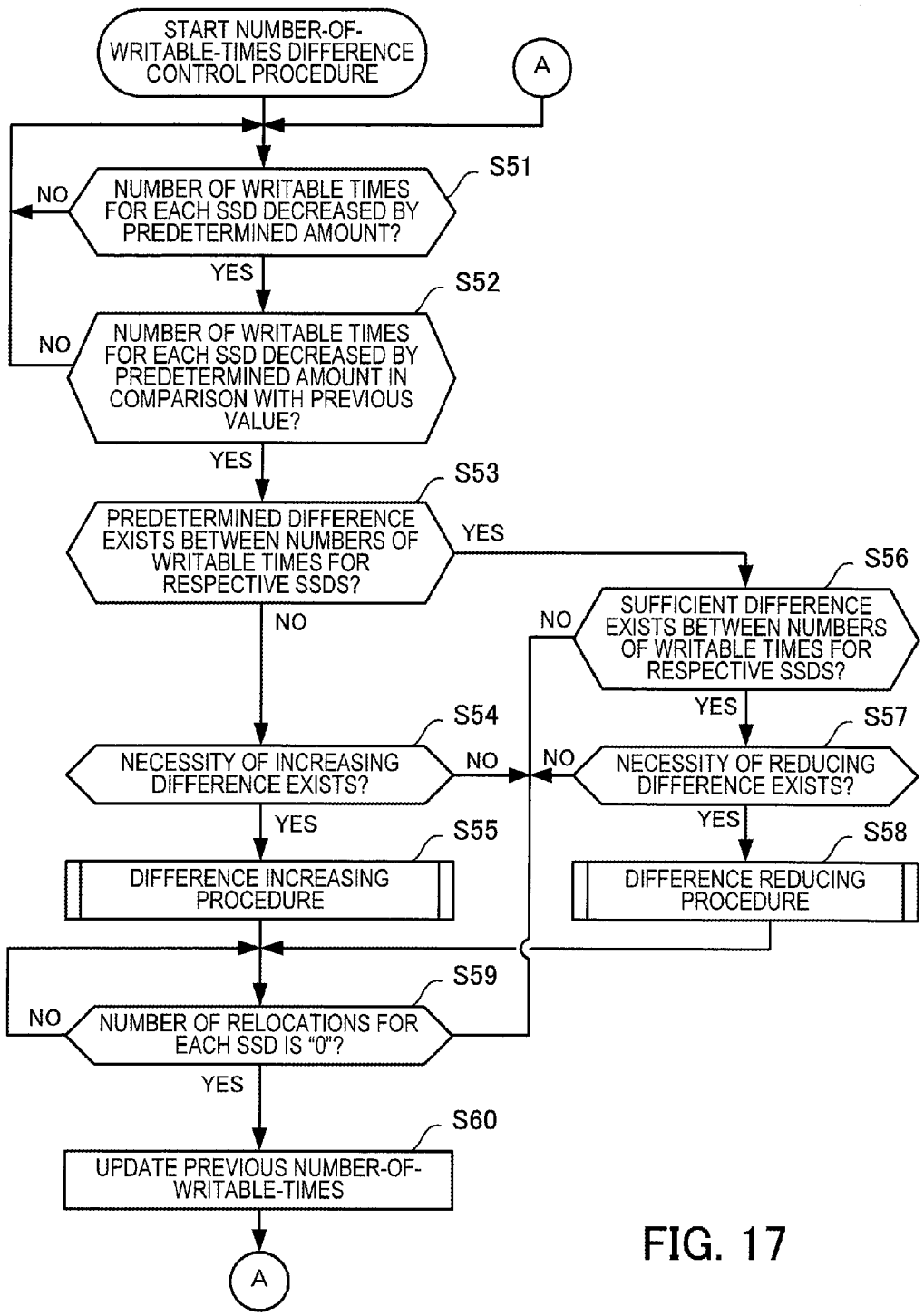
FIG. 17 illustrates a flow chart of a number-of-writable-times difference control procedure of the second embodiment.

Next, updating of the relocation table 53 used to determine the relocation source SSD and the relocation destination SSD will be described, referring to FIGS. 17 to 25. The NAS device 20 may control the validity of changing the write frequency to each SSD 212 by changing the number of relocations stored in the relocation table 53. FIG. 17 illustrates a flow chart of a number-of-writable-times difference control procedure of the second embodiment. The NAS device 20 performs the number-of-writable-times difference control procedure after having performed the initialization procedure.

[Step S51] The processor 22 determines whether or not the number of writable times for each SSD has decreased by a predetermined amount. The processor 22 proceeds to step S52 when the number of writable times for each SSD has decreased by a predetermined amount or, when the number of writable times for each SSD has not decreased by a predetermined amount, waits until it decreases by the predetermined amount. Here the predetermined amount is the difference control threshold value initialized at step S15 of the initialization procedure. The processor 22 updates the current number-of-writable-times management table 50 according to the number of writable times for each SSD obtained here.

[Step S52] The processor 22 compares the number of writable times (current value) of the current number-of-writable-times management table 50 and the number of writable times (previous value) of the previous number-of-writable-times management table 51. The processor 22 proceeds to step S53 when the current value has decreased by a predetermined amount in comparison with the previous value, or proceeds to step S51 when it has not decreased by a predetermined amount. Here, although a predetermined amount is a fixed value such as a 2% decrease, for example, a variably settable value may also be used, similarly to the difference control threshold value.

[Step S53] The processor 22 determines whether or not there exists a predetermined amount of difference between the numbers of writable times for respective SSDs 212. The processor 22 proceeds to step S56 when there exists a predetermined amount of difference between the numbers of writable times for respective SSDs 212, or proceeds to step S54 when a predetermined amount of difference does not exist. Here, a predetermined amount of difference is the number-of-writable-times difference value initialized at step S14 of the initialization procedure. Existence of a predetermined amount of difference between the numbers of writable times for respective SSDs 212 refers to a state in which all the numbers of writable times for the SSDs 212 constituting the RAID group are different from the numbers of writable times of other SSDs 212 by an amount equal to or larger than the number-of-writable-times difference value.

[Step S54] The processor 22 determines the necessity of increasing the difference of the numbers of writable times for respective SSDs 212. The processor 22 proceeds to step S55 when there is a necessity of increasing the difference of the numbers of writable times for respective SSDs 212, or proceeds to step S60 when there is no such necessity. As for the necessity of increasing the difference of the numbers of writable times for respective SSDs 212, it is determined unnecessary when there exists a predetermined amount of change by comparing the number of writable times (current value) in the current number-of-writable-times management table 50 and the number of writable times (previous value) in the previous number-of-writable-times management table 51. The predetermined amount of change is preliminarily set as a threshold value of the determination criteria.

[Step S55] The processor 22 performs the difference increasing procedure. The difference increasing procedure is a process of updating the relocation table 53 so that the difference of the numbers of writable times for respective SSDs 212 increases. The difference increasing procedure will be described below, referring to FIGS. 18 to 21.

[Step S56] The processor 22 determines whether or not there is a sufficient difference between the numbers of writable times for respective SSDs 212. The processor 22 proceeds to step S57 when there is a sufficient difference between the numbers of writable times for respective SSDs 212, or proceeds to step S60 when there is no sufficient difference. The sufficient difference between the numbers of writable times for respective SSDs 212 is preliminarily set as the upper limit value of the acceptable difference. For example, when the number of writable times for the SSD 212 is 10000 at the time of shipment, 550 times which corresponds to 5.5% (10% increase to the number-of-writable-times difference value), is set as the upper limit value.

[Step S57] The processor 22 determines the necessity of reducing the difference of the numbers of writable times for respective SSDs 212. The processor 22 proceeds to step S58 when there is a necessity of reducing the difference of the numbers of writable times for respective SSDs 212, or proceeds to step S60 when there is no such necessity. As for the necessity of reducing the difference of the numbers of writable times for respective SSDs 212, it is determined unnecessary when there exists a predetermined amount of change by comparing the number of writable times (current value) in the current number-of-writable-times management table 50 and the number of writable times (previous value) in the previous number-of-writable-times management table 51. The predetermined amount of change is preliminarily set as a threshold value of the determination criteria.

[Step S58] The processor 22 performs a difference reducing procedure. The difference reducing procedure is a process of updating the relocation table so that the difference of the numbers of writable times for respective SSDs 212 decreases. The difference reducing procedure will be described below, referring to FIGS. 22 to 25.

[Step S59] The processor 22 determines whether or not the number of relocations for each SSD 212 is "0", referring to the relocation table 53. The processor 22 proceeds to step S60 when the number of relocations for each SSD 212 is "0" or, when the number of relocations is not "0", waits until it becomes "0". The number of relocations in the relocation table 53 is updated so that the number of relocations approaches "0" by execution of the data relocation writing procedure.

[Step S60] The processor 22 updates the previous number-of-writable-times management table 51 with the current number-of-writable-times management table 50. In other words, the previous number-of-writable-times management table 51 is replaced by the current number-of-writable-times management table 50. The processor 22 proceeds to step S51 after having updated the previous number-of-writable-times management table 51.

Figure 18:
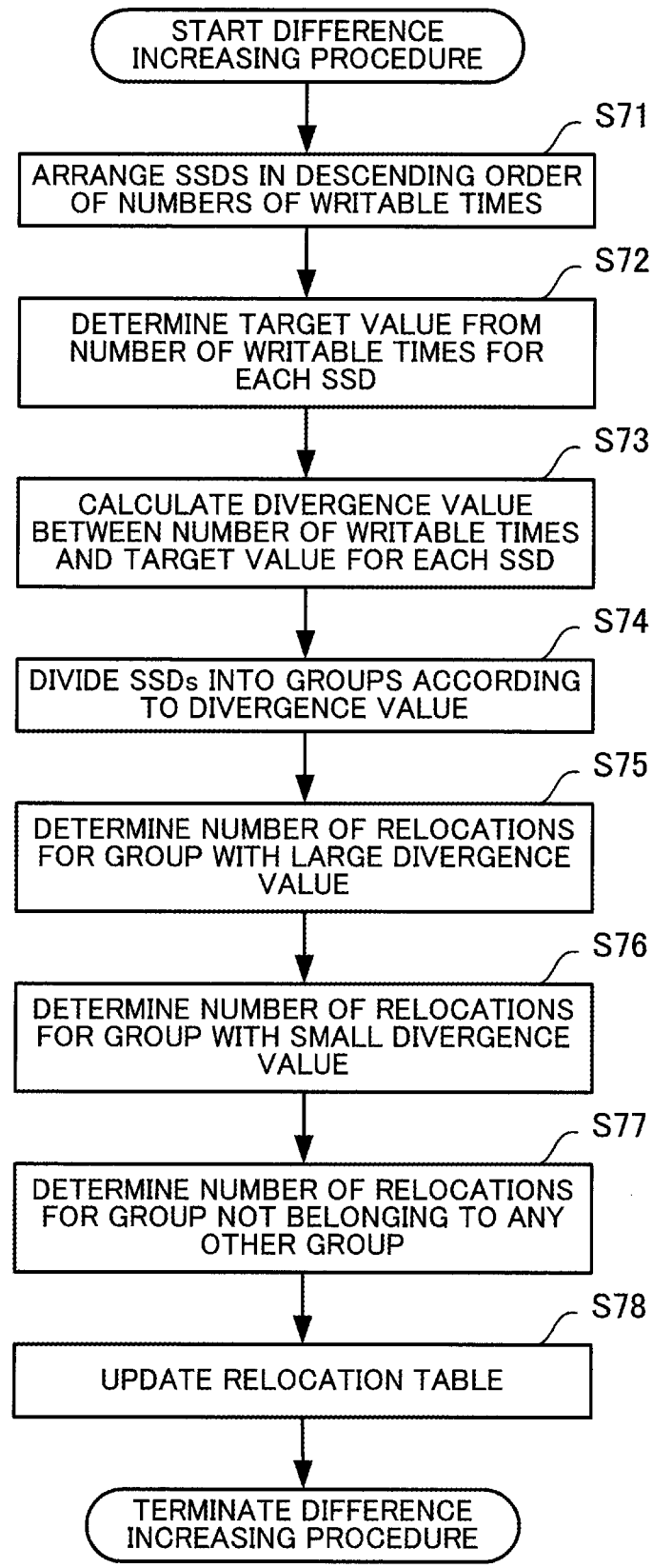
FIG. 18 illustrates a flow chart of a difference increasing procedure of the second embodiment.

Next, the difference increasing procedure will be described, referring to FIGS. 18 to 21. FIG. 18 illustrates a flow chart of the difference increasing procedure of the second embodiment. The NAS device 20 performs the difference increasing procedure at step S55 of the number-of-writable-times difference control procedure.

Figure 19:
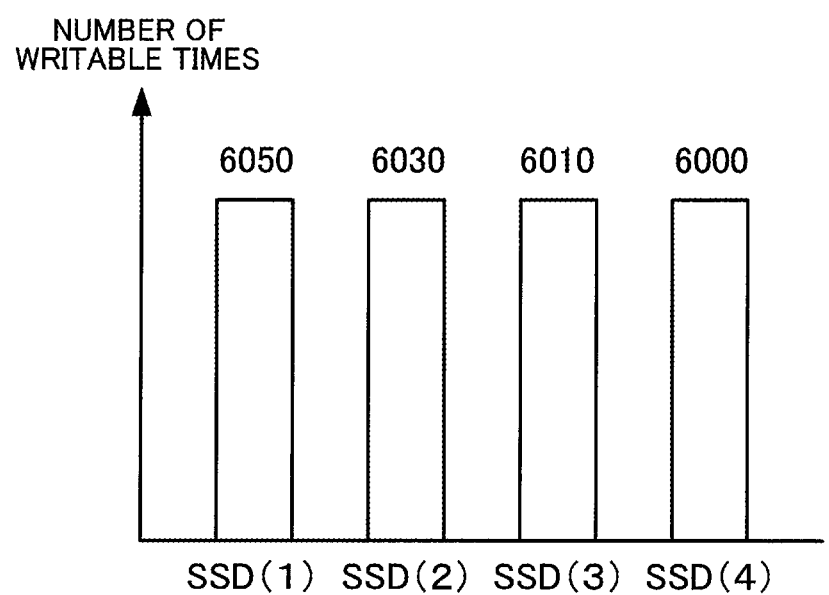
FIG. 19 illustrates an exemplary state of numbers of writable times for a plurality of SSDs before control.

[Step S71] The processor 22 arranges the SSDs 212 in the descending order of the numbers of writable times, referring to the current number-of-writable-times management table 50. Here, FIG. 19 illustrates reference values of the numbers of writable times in the current number-of-writable-times management table 50. FIG. 19 illustrates an exemplary state before controlling the numbers of writable times for a plurality of SSDs. According to FIG. 19, the numbers of writable times for the SSD (1), the SSD (2), the SSD (3) and the SSD (4) constituting the RAID group are "6050", "6030", "6010" and "6000", respectively. Therefore, the SSD (1), the SSD (2), the SSD (3) and the SSD (4) are arranged in the order of: SSD (1), SSD (2), SSD (3) and SSD (4).

Figure 20:
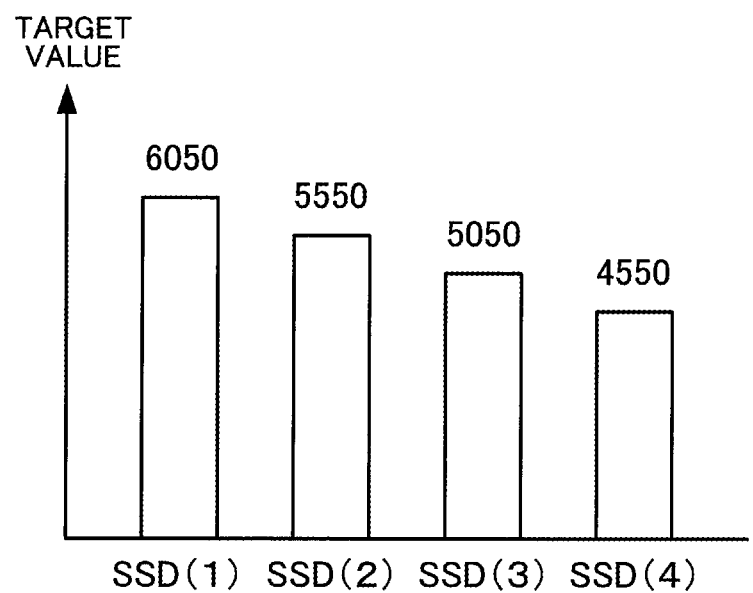
FIG. 20 illustrates an exemplary state of control targets of numbers of writable times for the plurality of SSDs.

[Step S72] The processor 22 determines a target value from the number of writable times for each SSD 212. Since it is not possible to increase the number of writable times, the target value is determined on the basis of the maximum number of writable times. For example, the SSD (1) has a target value "6050" which is equal to the number of writable times, and the SSD (2) has a target value "5550" resulted from subtracting a number-of-writable-times difference value "500" from the number of writable times "6050" for the SSD (1). The SSD (3) has a target value "5050" resulted from subtracting the number-of-writable-times difference value "500" from the number of writable times "5550" for the SSD (2), and the SSD (4) has a target value "4550" resulting from subtracting the number-of-writable-times difference value "500" from the number of writable times "5050" for the SSD (3). FIG. 20 illustrates the target values calculated in this manner. FIG. 20 illustrates an exemplary state of targets of controlling the numbers of writable times for a plurality of SSDs. According to FIG. 20, the numbers of writable times for respective SSDs 212 are arranged in a manner decreasing by the number-of-writable-times difference value "500", thereby reducing the risk of simultaneous failure of a plurality of SSDs 212 constituting the RAID group.

[Step S73] The processor 22 calculates a divergence value between the number of writable times and the target value for each SSD 212. For example, divergence values for the SSD (1), the SSD (2), the SSD (3) and the SSD (4) are "0", "480", "960" and "1450", respectively, according to the numbers of writable times illustrated in FIG. 19 and the target values illustrated in FIG. 20.

[Step S74] According to the calculated divergence values, the processor 22 divides the SSDs 212 into three groups, i.e., a group with a large divergence value, a group with a small divergence value, and a group not belonging to both the group with a large divergence value and the group with a small divergence value. The grouping may be into two groups, i.e., a group with a large divergence value and a group with a small divergence value. For example, the SSD (3) and the SSD (4) belong to the group with a large divergence value, whereas the SSD (1) and the SSD (2) belong to the group with a small divergence value. When there are an odd number of SSDs 212 constituting the RAID, an SSD 212 not belonging to both the group with a large divergence value and the group with a small divergence value is assigned to a group not belonging to any other group.

[Step S75] The processor 22 determines the number of relocations for the group with a large divergence value. The number of relocations for the group with a large divergence value is determined in a weighted manner according to the descending order of the numbers and divergence values of the SSDs 212 belonging to the group with a large divergence value. The number of relocations may be determined by calculation based on a preset calculation formula, or may be a fixed value depending on the divergence values, the numbers of writable times, or the order of number of writable times. For example, the number of relocations may be determined as indicated by formula (1).

Number of relocations=(100/number of SSDs in group with large divergence value)×(ordinal number in the ascending order of divergence values in group with large divergence value) (1)

Accordingly, the number of relocations for the SSD (4) is given by "100(=(100/2)×2)" and the number of relocations for the SSD (3) is given by "50(=(100/2)×1)".

[Step S76] The processor 22 determines the number of relocations for the group with a small divergence value. The number of relocations for the group with a small divergence value is determined in a weighted manner according to the ascending order of the numbers and divergence values of the SSDs 212 belonging to the group with a small divergence value. The number of relocations may be determined by calculation based on a preset calculation formula, or may be a fixed value depending on the divergence values, the numbers of writable times, or the order of number of writable times. For example, the number of relocations may be determined as indicated by formula (2).

Number of relocations=(−100/number of SSDs in group with small divergence value)×(ordinal number in descending order of divergence values in group with small divergence value) (2)

Accordingly, the number of relocations for the SSD (2) is given by "−50 (=(−100/2)×1)" and the number of relocations for the SSD (1) is given by "−100(=(−100/2)×2)".

[Step S77] The processor 22 determines the number of relocations for the group not belonging to any other group. The number of relocations for the group not belonging to any other group is determined to be "0".

[Step S78] The processor 22 updates the relocation table 53 with the determined number of relocations. The total number of relocations for respective SSDs 212 stored in the relocation table 53 is "0".

Accordingly, the NAS device 20 may control increase or suppression of the pace of reducing the number of writable times for the SSD 212.

Figure 21:
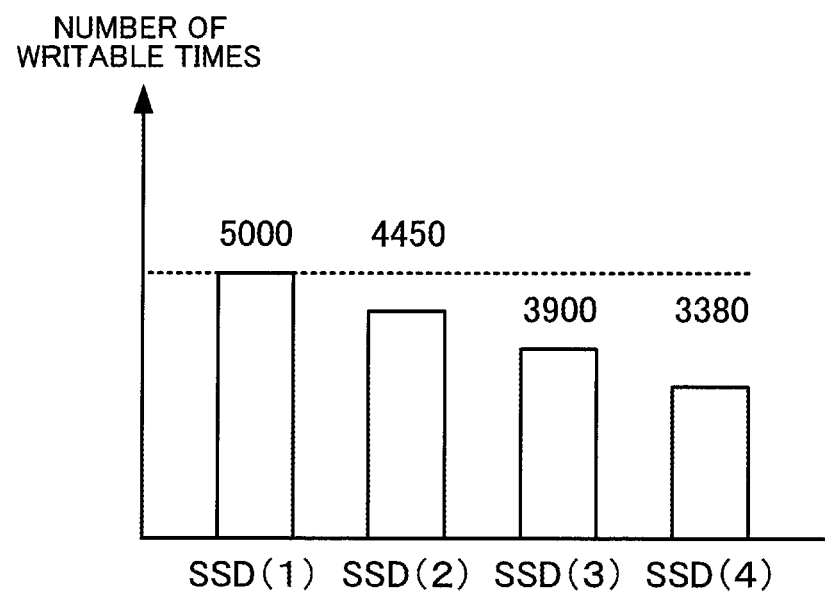
FIG. 21 illustrates an exemplary state of numbers of writable times for the plurality of SSDs after control.

After the relocation table 53 determined in the above manner has been used for the data relocation writing procedure, the numbers of writable times for the SSD (1), the SSD (2), the SSD (3) and the SSD (4) constituting the RAID group, for example, are such as those illustrated in FIG. 21. FIG. 21 illustrates an exemplary state after controlling the numbers of writable times for a plurality of SSDs. According to FIG. 21, the numbers of writable times for the SSD (1), the SSD (2), the SSD (3) and the SSD (4) constituting the RAID group are "5000", "4450", "3900" and "3380", respectively. Therefore, the SSD (1), the SSD (2), the SSD (3) and the SSD (4) are arranged, with a number-of-writable-times difference value equal to or larger than "500" between each number of writable times. The RAID group constituted by the SSD (1), the SSD (2), the SSD (3) and the SSD (4) as described above has a reduced risk of simultaneous failure of two or more SSDs 212, thereby further improving the reliability.

Figure 22:
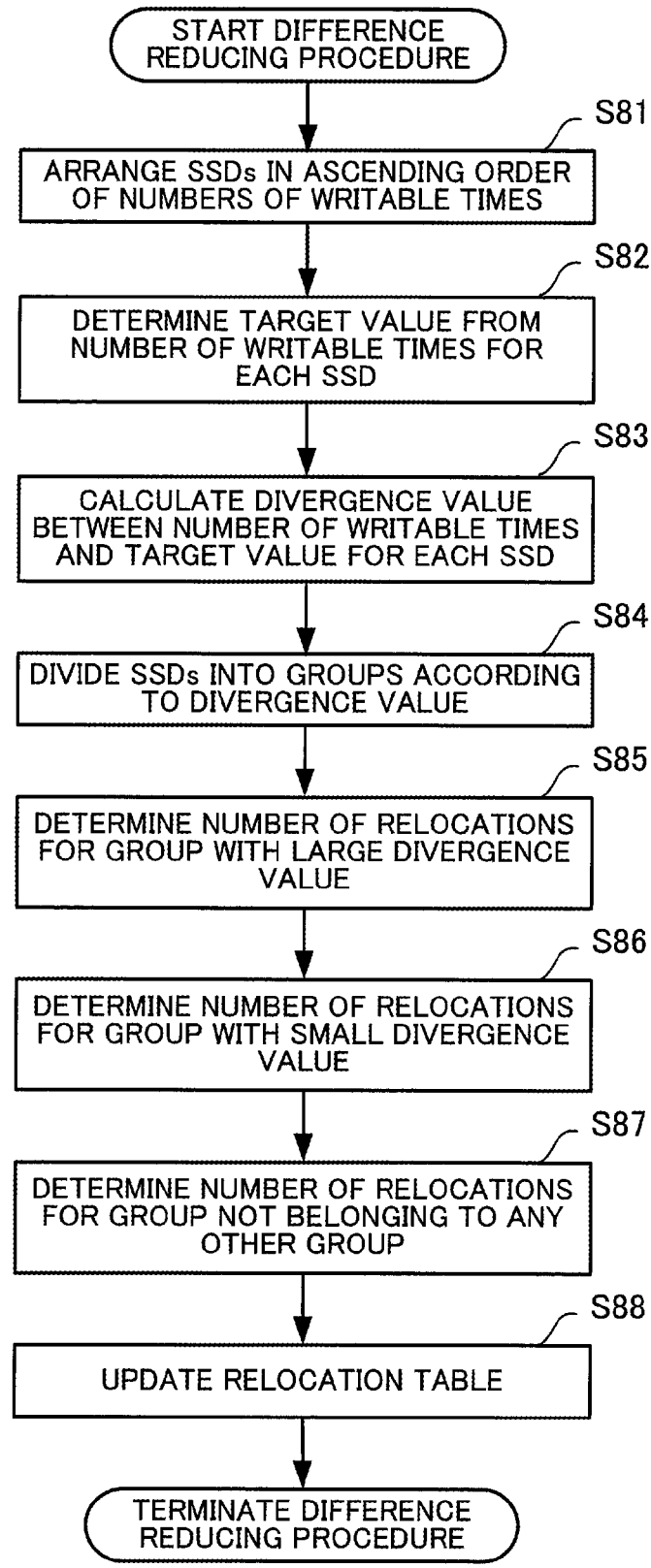
FIG. 22 illustrates a flow chart of a difference reducing procedure of the second embodiment.

Next, the difference reducing procedure will be described, referring to FIGS. 22 to 25. FIG. 22 illustrates a flow chart of the difference reducing procedure of the second embodiment. The NAS device 20 performs the difference reducing procedure at step S58 of the number-of-writable-times difference control procedure.

Figure 23:
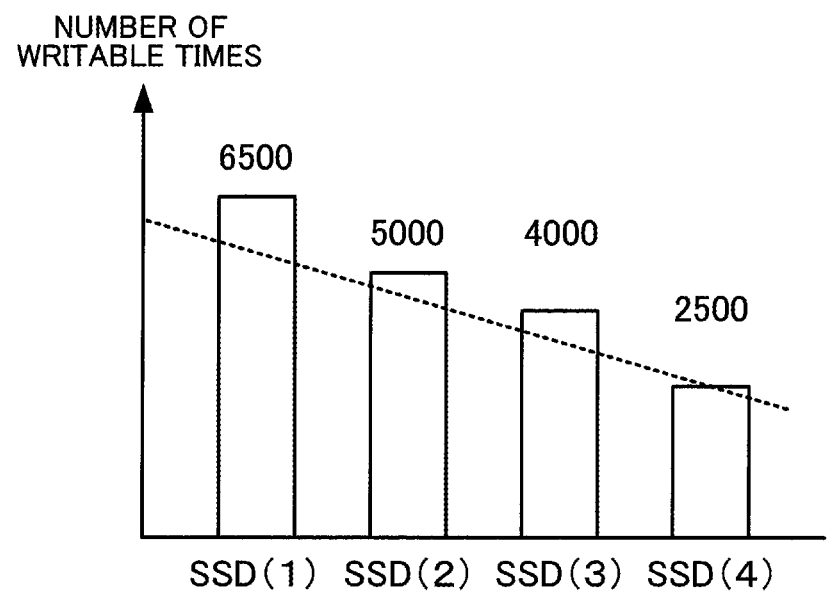
FIG. 23 illustrates an exemplary state of numbers of writable times for the plurality of SSDs before control.

[Step S81] The processor 22 arranges the SSDs 212 in the ascending order of the numbers of writable times, referring to the current number-of-writable-times management table 50. Here, FIG. 23 illustrates reference values of the number of writable times in the current number-of-writable-times management table 50. FIG. 23 illustrates an exemplary state before controlling the numbers of writable times for a plurality of SSDs. According to FIG. 23, the number of writable times for the SSD (1), the SSD (2), the SSD (3) and the SSD (4) constituting the RAID group are "6500", "5000", "4000" and "2500", respectively. Therefore, the SSD (1), the SSD (2), the SSD (3) and the SSD (4) are arranged in the order of: SSD (4), SSD (3), SSD (2) and SSD (1).

Figure 24:
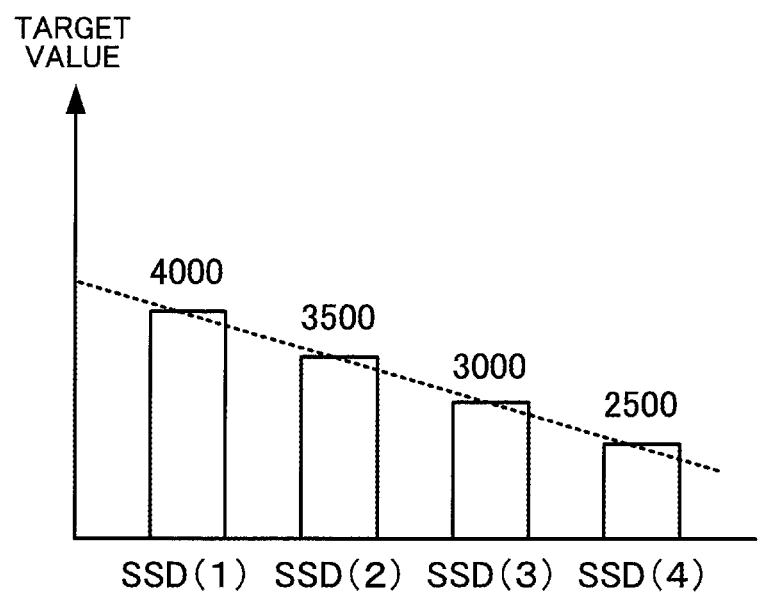
FIG. 24 illustrates an exemplary state of control targets of numbers of writable times for the plurality of SSDs.

[Step S82] The processor 22 determines a target value from the number of writable times for each SSD 212. The target value is determined on the basis of the minimum number of writable times. For example, the SSD (4) has a target value "2500" which is equal to the number of writable times, and SSD (3) has a target value "3000" resulted from adding the number-of-writable-times difference value "500" to the number of writable times "2500" for the SSD (4). The SSD (2) has a target value "3500" resulted from adding the number-of-writable-times difference value "500" to the number of writable times "3000" for the SSD (3), and the SSD (1) has a target value "4000" resulted from adding the number-of-writable-times difference value "500" to the number of writable times "3500" for the SSD (2). FIG. 24 illustrates the target values calculated in this manner. FIG. 24 illustrates an exemplary state of targets of controlling the numbers of writable times for a plurality of SSDs. According to FIG. 24, the numbers of writable times for respective SSDs 212 are arranged with the number-of-writable-times difference value 500" different from each other, thereby reducing the risk of simultaneous failure of a plurality of SSDs 212 constituting the RAID group.

[Step S83] The processor 22 calculates a divergence value between the number of writable times and the target value for each SSD 212. For example, divergence values for the SSD (1), the SSD (2), the SSD (3) and the SSD (4) are "2500", "1500", "1000" and "0", respectively, according to the numbers of writable times illustrated in FIG. 23 and the target values illustrated in FIG. 24.

[Step S84] According to the calculated divergence values, the processor 22 divides the SSDs 212 into three groups, i.e., a group with a large divergence value, a group with a small divergence value, and a group not belonging to both the group with a large divergence value and the group with a small divergence value. The grouping may be into two groups, i.e., a group with a large divergence value and a group with a small divergence value. For example, the SSD (1) and the SSD (2) belong to the group with a large divergence value, whereas the SSD (3) and the SSD (4) belong to the group with a small divergence value. When there are an odd number of SSDs 212 constituting the RAID, an SSD 212 not belonging to both the group with a large divergence value and the group with a small divergence value is assigned to a group not belonging to any other group.

[Step S85] The processor 22 determines the number of relocations for the group with a large divergence value. The number of relocations for the group with a large divergence value is determined in a weighted manner according to the descending order of the numbers and divergence values of the SSDs 212 belonging to the group with a large divergence value. The number of relocations may be determined by calculation based on a preset calculation formula, or may be a fixed value depending on the divergence values, the numbers of writable times, or the order of number of writable times. For example, the number of relocations may be determined as indicated by formula (1).

Accordingly, the number of relocations for the SSD (1) is given by "$100(=(100/2)\times2)$" and the number of relocations for the SSD (2) is given by "$50(=(100/2)\times1)$".

[Step S86] The processor 22 determines the number of relocations for the group with a small divergence value. The number of relocations for the group with a small divergence value is determined in a weighted manner according to the ascending order of the numbers and divergence values of the SSDs 212 belonging to the group with a small divergence value. The number of relocations may be determined by calculation based on a preset calculation formula, or may be a fixed value depending on the divergence values, the numbers of writable times, or the order of number of writable times. For example, the number of relocations may be determined as indicated by formula (2).

Accordingly, the number of relocations for the SSD (3) is given by "$-50(=(-100/2)\times1)$" and the number of relocations for the SSD (4) is given by "$-100(=(-100/2)\times2)$".

[Step S87] The processor 22 determines the number of relocations for the group not belonging to any other group. The number of relocations for the group not belonging to any other group is determined to be "0".

[Step S88] The processor 22 updates the relocation table 53 with the determined number of relocations. The total number of relocations for respective SSDs 212 stored in the relocation table 53 is "0".

Accordingly, the NAS device 20 may control increase or suppression of the pace of reducing the number of writable times for the SSD 212.

Figure 25:
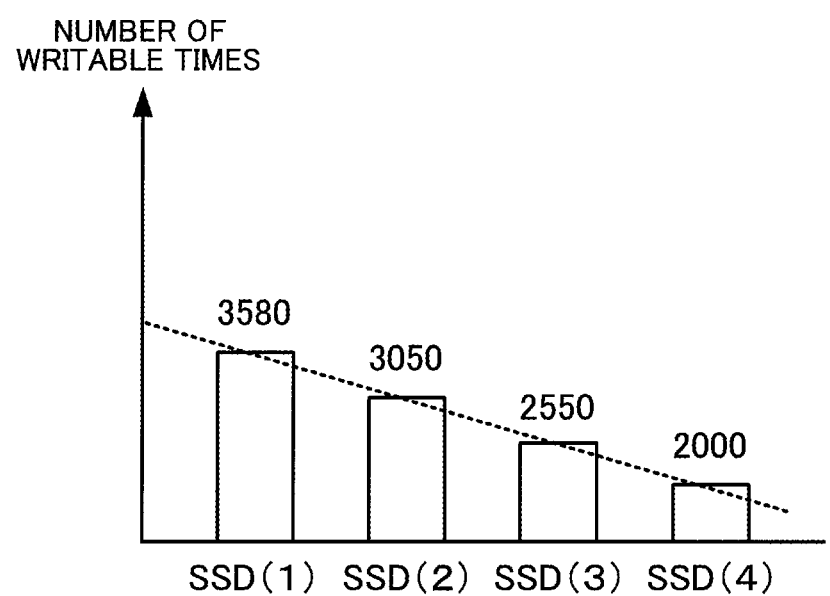
FIG. 25 illustrates an exemplary state of numbers of writable times for the plurality of SSDs after control.

After the relocation table 53 thus determined is used for the data relocation writing procedure, the numbers of writable times for the SSD (1), the SSD (2), the SSD (3) and the SSD (4) constituting the RAID group, for example, are such as those illustrated in FIG. 25. FIG. 25 illustrates an exemplary state after controlling the numbers of writable times for a plurality of SSDs. According to FIG. 25, the numbers of writable times for the SSD (1), the SSD (2), the SSD (3) and the SSD (4) constituting the RAID group are "3580", "3050", "2550" and "2000", respectively. Therefore, the SSD (1), the SSD (2), the SSD (3) and the SSD (4) are arranged, with a number-of-writable-times difference value equal to or larger than "500" between each number of writable times. The RAID group constituted by the SSD (1), the SSD (2), the SSD (3) and the SSD (4) described above has a reduced risk of simultaneous failure of two or more SSDs 212, thereby further improving the reliability.

Figure 26:
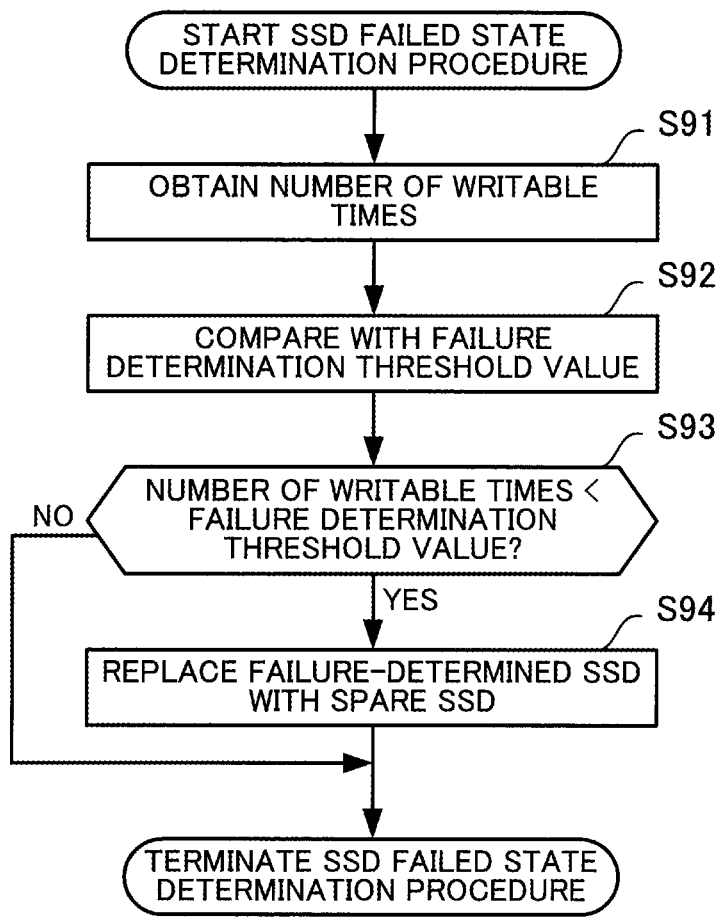
FIG. 26 illustrates a flow chart of an SSD failed state determination procedure of the second embodiment.

Next, an SSD failed state determination procedure will be described, referring to FIG. 26. FIG. 26 illustrates a flow chart of the SSD failed state determination procedure of the second embodiment. The NAS device 20 performs the SSD failed state determination procedure at a desired timing (after having performed the writing procedure, for example).

[Step S91] The processor 22 obtains the number of writable times from the current number-of-writable-times management table 50.

[Step S92] The processor 22 compares the obtained number of writable times with a failure determination threshold value.

[Step S93] The processor 22 proceeds to step S94 when the obtained number of writable times is smaller than the failure determination threshold value (when determined as failure), or terminates the SSD failed state determination procedure when the obtained number of writable times is not smaller than the failure determination threshold value.

[Step S94] The processor 22 replaces the SSD determined to have failed (failure-determined SSD) 212 with an SSD (spare SSD) 212 prepared as a spare disk. After having replaced the failure-determined SSD with the spare SSD, the processor 22 terminates the SSD failed state determination procedure.

Accordingly, since the NAS device 20 may separate and replace an SSD 212 before failure, a highly reliable RAID may be constructed. In addition, since the SSD 212 is replaced with the spare SSD before occurrence of a failure, the NAS device 20 may reduce the processing cost relating to reconstruction of data in comparison with reconstruction of data after failure.

The aforementioned processing function may be realized by a computer. In such a case, there is provided a program describing the content of processing the function which needs to be owned by the NAS device 20 and the storage control apparatus 1 described in the first embodiment. Executing the program by a computer realizes the processing function on the computer. The program describing the processing content may be stored in a computer-readable storage medium. The computer-readable storage medium may be a magnetic memory device, an optical disk, a magneto-optical storage medium, a semiconductor memory, or the like. The magnetic memory device may be a hard disk drive (HDD), a flexible disk (FD), a magnetic tape, or the like. The optical disk may be a DVD, a DVD-RAM, a CD-ROM/RW, or the like. The magneto-optical storage medium may be an MO (Magneto-Optical disk), or the like.

For distributing a program, a portable storage medium storing the program such as a DVD or a CD-ROM, for example, may be put on the market. In addition, a program may be stored in a storage device of a server computer and the program may be transferred to other computers from the server computer via a network.

A computer executing a program stores, for example, the program stored in a portable storage medium or transferred from a server computer, into a storage device of the computer. The computer then reads the program from the storage device of the computer and performs a procedure according to the program. The computer may also read the program directly from the portable storage medium and perform a procedure according to the program. In addition, whenever a program is transferred from a server computer connected via a network, the computer may also sequentially perform a procedure according to the received program.

In addition, at least a part of the aforementioned processing function may also be realized by an electronic circuit such as a DSP, an ASIC or a PLD.

According to an aspect, the risk of data loss due to simultaneous failure of a plurality of storage media may be reduced in a storage control apparatus and computer-readable storage media.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
a memory configured to hold a number of data writable times for each of storage media constituting a RAID group, data write destinations in the storage media, and a number of data writing times for each of areas in the storage media, the storage media each having a limitation on the number of data writable times and being subject to failure management, the data write destinations being obtained by segmenting each of the storage media into predetermined units; and
one or more processors configured to perform a procedure including:
first determining, based on the number of data writable times for each of the storage media, a first storage medium for which a reduction pace of the number of data writable times is suppressed and a second storage medium for which the reduction pace of the number of data writable times is increased so that the number of data writable times for each of the storage media constituting the RAID group has a preset difference, the first storage medium and the second storage medium being included in the storage media constituting the RAID group;
second determining, when updating write object data whose write destination is set to a first area in the first storage medium, whether or not to relocate the write object data based on the number of data writing times for the first area;
relocating, when relocation of the write object data is determined, the write object data by setting a write destination to a second area in the second storage medium; and
updating the data write destinations in the storage media held in the memory, according to the relocating.

2. The storage control apparatus according to claim 1, wherein the relocating includes relocating data stored in the second area of the second storage medium to the first area.

3. The storage control apparatus according to claim 1, wherein the second determining includes determining to relocate the write object data when the write object data is stored in the first area having the number of data writing times in the first storage medium evaluated to be larger than a predetermined reference value.

4. The storage control apparatus according to claim 1, wherein the first determining includes determining the first storage medium, based on a difference between the number of data writable times for each of the storage media and a target value of the number of data writable times for each of the storage media.

5. The storage control apparatus according to claim 1, wherein the first determining includes determining the second storage medium, based on a difference between the number of data writable times for each of the storage media and a target value of the number of data writable times for each of the storage media.

6. The storage control apparatus according to claim 1, wherein the relocating includes selecting an area having the number of writing times in the second storage medium evaluated to be smaller than a predetermined reference value, as the second area.

7. The storage control apparatus according to claim 4, wherein the first determining includes determining the target value so that the number of data writable times for each of storage media constituting the RAID group has the preset difference, and determining the first storage medium and the second storage medium based on a divergence value between the target value and the number of data writable times for each of the storage media constituting the RAID group.

8. The storage control apparatus according to claim 1, comprising a replacement storage medium in advance, wherein the procedure further includes determining that the storage medium is in a failed state when the number of data writing times of the storage medium exceeds a predetermined threshold value, and replacing the storage medium with the replacement storage medium.

9. The storage control apparatus according to claim 1, wherein the storage medium is a solid state drive having a limit on the number of data writable times.

10. A non-transitory computer-readable storage medium storing a computer program that causes a computer to perform a procedure comprising:
managing a number of data writable times for each of storage media constituting a RAID group, the storage media each having a limitation on the number of data writable times and being subject to failure management;
managing data write destinations of data to the storage media, the data write destinations being obtained by segmenting each of the storage media into areas;
managing a number of data writing times of the data for each of the areas;
first determining, based on the number of data writable times for each of the storage media, a first storage medium for which a reduction pace of the number of data writable times is suppressed and a second storage medium for which the reduction pace of the number of data writable times is increased so that the number of data writable times for each of the storage media constituting the RAID group has a preset difference, the first storage medium and the second storage medium being included in the storage media constituting the RAID group;
second determining, when updating write object data whose write destination is set to a first area in the first storage medium, whether or not to relocate the write object data based on the number of data writing times for the first area;
relocating, when relocation of the write object data is determined, the write object data by setting a write destination to a second area in the second storage medium; and
updating the data write destinations in the storage media, according to the relocating.

* * * * *